United States Patent
Yamamoto et al.

(10) Patent No.: US 7,088,067 B2
(45) Date of Patent: Aug. 8, 2006

(54) MOTOR DRIVING APPARATUS AND MOTOR DRIVING METHOD

(75) Inventors: Yasunori Yamamoto, Hirakata (JP); Hideaki Mori, Nishinomiya (JP); Shinichi Kuroshima, Ibaraki (JP); Hideki Nishino, Takatsuki (JP); Taishi Iwanaga, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/191,853

(22) Filed: Jul. 27, 2005

(65) Prior Publication Data

US 2006/0028161 A1    Feb. 9, 2006

(30) Foreign Application Priority Data

Jul. 28, 2004    (JP)    ............ P2004-219663

(51) Int. Cl.
*H02P 7/00*    (2006.01)
(52) U.S. Cl. .............. 318/432; 318/434; 318/439; 318/138; 318/254
(58) Field of Classification Search ........... 318/432, 318/434, 138, 439, 254, 599, 700, 800
See application file for complete search history.

(56) References Cited

U.S. PATENT DOCUMENTS

| | | | |
|---|---|---|---|
| 6,674,258 B1 * | 1/2004 | Sakai et al. | 318/439 |
| 6,710,569 B1 * | 3/2004 | Iwanaga et al. | 318/599 |
| 6,940,239 B1 * | 9/2005 | Iwanaga et al. | 318/268 |
| 2003/0102832 A1 | 6/2003 | Iwanaga et al. | |

FOREIGN PATENT DOCUMENTS

| | | |
|---|---|---|
| JP | 2892164 | 2/1999 |
| JP | 2003-174789 | 6/2003 |

* cited by examiner

*Primary Examiner*—Rina Duda
*Assistant Examiner*—Tyrone Smith
(74) *Attorney, Agent, or Firm*—RatnerPrestia

(57) ABSTRACT

A motor driving apparatus has a driver circuit configuration capable of individually adjusting three phase coil currents. Coil current waveforms are formed to have a total of three phase shaft direction forces to be zero in compliance with predetermined mathematical expressions, and thus, three phase coil current profiles can be made independent of one another, and vibration-causing factors attributed to the fact that a certain phase is in an non-energized state are corrected by adjusting the current profiles of the other phases. Consequently, the vibration and the noise can be reduced.

30 Claims, 13 Drawing Sheets

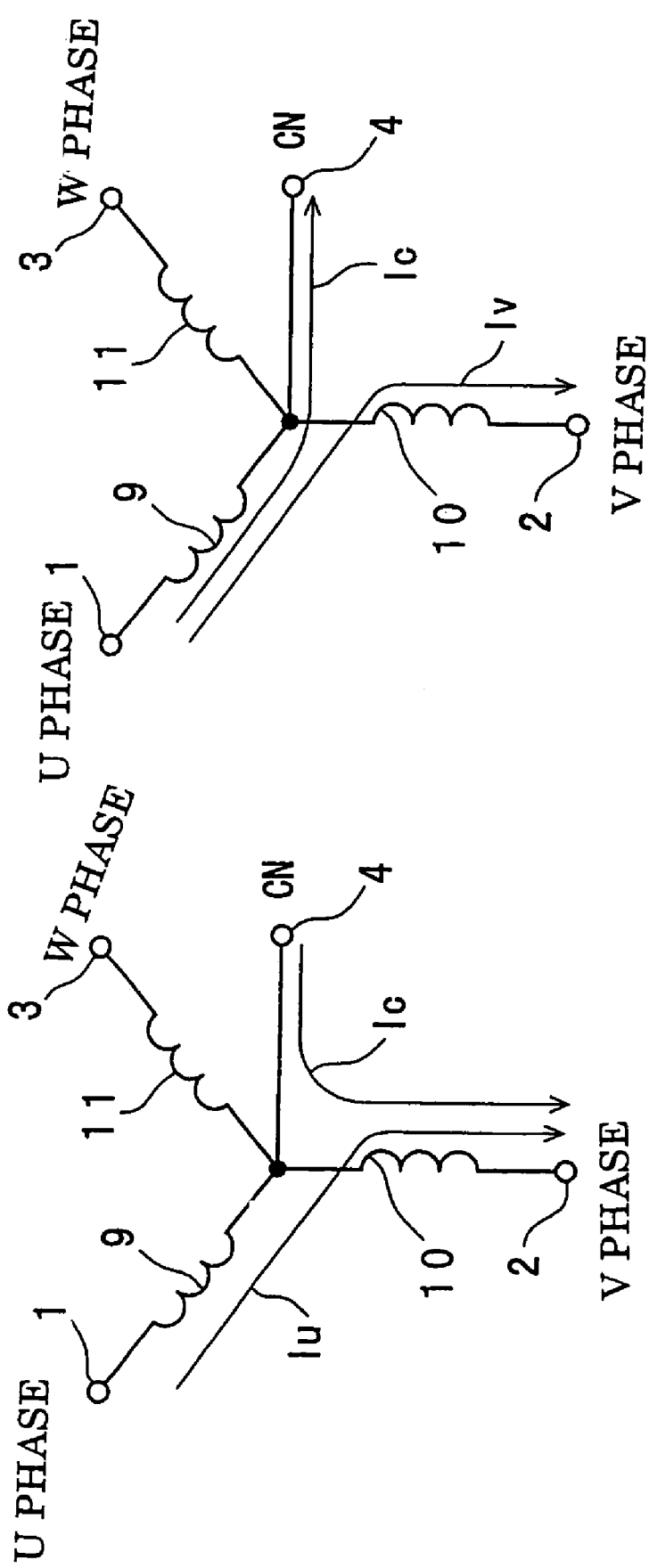

US 7,088,067 B2

MOTOR DRIVING APPARATUS AND MOTOR DRIVING METHOD

BACKGROUND OF THE INVENTION

1. Field of the Invention

The present invention generally relates to multiphase-motor driving and control techniques. More specifically, the invention relates to a motor driving apparatus and a motor driving method for a rotor-position sensorless motor having no rotor position sensor such as a Hall-effect device for sensing a rotor position.

2. Description of Related Art

In recent years, in sensorless driving of a small three-phase motor, switching timing of an energized-phase is controlled by providing a non-energized period (also referred to as "current-OFF period", hereinafter) in which a coil current of one phase in a "Y" connection (i.e., "star connection") coil is set to zero. More specifically, energized-phase switching timing is controlled by detecting zero crossings of back electromotive voltages associated with rotor rotation which are generated in an inter-terminal potential difference between both terminals, namely between an energization terminal and a neutral point terminal, of the coil of the phase during the non-energized period.

Conventionally, when abrupt current variations occur in switching of an energized-phase, there arise vibrations and noises to be drawbacks. In order to reduce such vibrations, noises, and the like, for example, Patent document 1, i.e., Japanese Patent No. 2892164 discloses a method for smoothing current variations. FIG. 11 shows a basic circuit configuration as disclosed in the patent document. Referring to FIG. 11, reference numeral 16 denotes a rotor position detector section which includes three comparators 24 corresponding to three phases (U, V, and W phases) and a phase-processing logic circuit 23. The inter-terminal potential differences of the respective motor coils during the non-energized periods are compared by the comparators 24, and converted by the phase-processing logic circuit 23 to a rotor phase information signal.

In the configuration of FIG. 11, three phase driving current waveforms 101, 102, and 103 of a sensorless motor are obtainable as shown in FIG. 12 in a phase-switching trapezoidal wave synthesizer section 21. These three phase driving current waveforms are formed to be smooth as trapezoidal wave shapes, and have non-energized periods Ta, Tb, Tc, Td, Te, and Tf for reading back electromotive voltages of coil terminals in order to detect the rotor position.

In addition, Patent document 2, i.e., Japanese Unexamined Laid-open Patent Publication No. 2003-174789 discloses a technique as outlined herebelow. This configuration includes a PWM (pulsewidth modulation) control section that generates PWM control pulses independent of each other and that performs PWM control, in parallel for two phases, of energization of a phase determined by an energization switching section. The configuration further includes a comparator section that performs comparison between a current detection signal indicative of a level of current flowing to a motor coil and various torque command signals generated by a torque command signal generator section. By determining an ON period of the PWM control pulse, the switching of the phase current is performed smoothly in the range from a low torque to a high torque, thereby reducing the motor vibrations and noises generated due to sharp changes in phase current. More specifically, according to Patent document 2, one phase coil terminal, except for a neutral point 4, is fixed to either one of a high potential and a low potential, and driving transistors of the remaining two phase coil terminals are alternately time-divided to be ON state so as to reach respective target current values or the sum current value thereof. Thus, these two phase coil current values are controlled, and an opposite-sign current obtained by summing the two phase currents is set as the current of the potential-fixed coil.

However, according to these conventional techniques, as shown in FIG. 11 for example, in the "Y"-connected three phase motor coils, there is not provided a driving transistor directly connected to the neutral point 4. In addition, the publication document does not discloses a technique for reducing the vibration and noise of the motor under controlling the coil current waveform of the other two phases in the energized state in the intervals Ta, Tb, Tc, Td, Te, and Tf wherein the coil of only any one of phases is in the non-energized state.

As in the conventional examples shown in FIGS. 11 and 12, even when coil current profiles of the individual phases are simply controlled to be trapezoidal wave shapes provided with non-energized intervals, significant vibrations and the noises are still generated. A reason therefor is that the motor vibration and noise are significantly dependent on components of a force that acts in the motor shaft direction between the rotor and the stator, wherein the current waveform includes a large amount of the vibration components acting in the shaft direction. When the motor rotor is virtually displaced in the shaft direction with respect to the motor stator, the magnetic flux across the respective phase coils is varied. Generally, the variation rate of such magnetic flux has the same waveform as the total magnetic flux across a corresponding phase coil. Hereafter, the magnetic flux variation rate will be referred to as either "magnetic flux variation rate in the motor shaft direction" or "shaft direction force constant". Different from a force (torque) acting in the rotation direction, the magnetic flux variation rate in the motor shaft direction applies as a force acting in the motor shaft direction, the force acting in the shaft direction is remarkably influenced by the current variation in a time region where the current exhibits a zero crossing. As such, the existence of the non-energized period of a coil causes a residue of shaft-direction vibration components having an amplitude of a non-negligible level, resulting in that sufficient suppression of the vibration, the noise, and the like can not be achieved.

Referring to FIGS. 13A to 13C, factors for not sufficiently suppressing the vibration and the noise of the motor having the non-energized periods in the coil current will be described referring to the case of a three-phase motor as an example. FIG. 13A includes the three phase driving current waveforms 101, 102, and 103, which are the same as those shown in FIG. 12. The three phase driving current waveforms represent first phase (U phase), second phase (V phase), and third phase (W phase) coil current waveforms each having a trapezoidal-wave shaped current waveform. Each of the three phase driving current waveforms 101, 102, 103 has a period wherein the coil current becomes zero, i.e., non-energized state in a period in the vicinity of the zero crossing of the respective current. Ta denotes a non-energized period in a current increasing region included in the coil current of the first phase, Tb denotes a non-energized period in a current increasing region included in the coil current of the second phase, and Tc denotes a non-energized period in a current increasing region included in the coil current of the third phase. Td denotes a non-energized period in a current decreasing region included in the coil current of the third phase, Te denotes a non-energized period in a current decreasing region included in the coil current of the first phase, and Tf denotes a non-energized period in a current decreasing region included in the coil current of the second phase.

It can easily be known that the summation of the respective phase coil currents 101, 102, and 103 results in a current value of zero as shown in FIG. 13A. This is an inevitable consequence of the case without driving means for directly driving the neutral point. Reference numeral 104 represents the waveform of the magnetic flux variation rate (shaft direction force constant) of the first phase with respect to the motor-shaft direction variation rate. The magnetic flux variation rate waveform 104 is approximately represented as a waveform proportional to a sine wave that is different in phase by an electrical angle of 90° from a sine wave component of a fundamental wave of the first phase coil current waveform 101. Generally, the magnetic flux variation rate relative to a displacement in a motor shaft direction can be said to be proportional to a sine waveform that is different in phase by an electrical angle of 90° from the magnetic flux variation rate relative to a displacement in the motor rotation direction. The magnetic flux variation rate relative to the motor-rotation-directional displacement is alternatively called a torque constant, and is distinguished from the shaft direction constant or the magnetic flux variation rate relative to the above-described motor-shaft direction displacement.

As such, a torque constant waveform in units of the respective phase coil current is represented in the form of a sine wave matching in phase with the fundamental wave of the respective phase coil current, and the shaft direction force constant in units of the respective phase coil current is represented in the form of a sine wave 90° delayed in phase from the respective torque constant waveform. The product of the multiplication of the first phase coil current 101 times the magnetic flux variation rate (shaft direction force constant) 104 relative to the motor-shaft direction displacement represents the motor-shaft direction force with respect to the first phase coil current. Although not shown in the drawings, similarly as in the case of the first phase, the second phase magnetic flux variation rate relative to a motor-shaft direction displacement is approximately represented proportional to a sine waveform that is different in phase by an electrical angle of 90° from the second phase coil current 102, and the product of the multiplication of the two values represents a motor-shaft direction force with respect to the second phase.

Similarly, third phase magnetic flux variation rate relative to the motor-shaft direction displacement is approximately represented proportional to a sine waveform that is different in phase by an electrical angle of 90° from the third phase coil current 103, and the product of the multiplication of the two values represents a motor-shaft direction force with respect to the third phase. Motor-shaft direction forces of individual phase coil currents of the first, second, and third phases are shown by waveforms 105, 106, and 107 in FIG. 13B. A synthetic motor-shaft direction force obtained by summing the motor-shaft direction forces 105, 106, and 107 of the three phases is shown by a waveform 108 in FIG. 13C. In the non-energized periods represented by Ta, Tb, Tc, Td, Te, and Tf, as shown in the synthetic motor-shaft direction force 108 in FIG. 13C, it can be known that vibration components of the shaft direction forces remain uncancelled. These result in residues of the vibration and noise.

In the example of FIGS. 13A to 13C, the shaft direction force remains in a period other than the above-described non-energized periods. This is because a current peak period (or, a current bottom period) representatively represented by 109 of FIG. 13A is long, and therefore the deviation from the sine wave having the trapezoidal waveform is large. This results in residues of the vibration and noise, similar to the above. As such, when the current peak period/current bottom period 109 is longitudinally steered to be an electrical angle of about 60°, the shaft direction force is reduced in a period other than the non-energized period.

In the motor driver circuit described in the conventional techniques, no driving transistor for directly driving the neutral point is connected in the "Y"-connected three phase motor coils. Accordingly, the total sum of the three phase coil currents becomes zero, and a coil-current freedom degree is 2. More specifically, when the coil current of one phase is set to zero to be in non-drive state, the freedom degree of the remaining two phases is only 1. Ordinarily, conventional driving methods are of the type restricted in the freedom degree, as described above. Consequently, according to motor driving with only the freedom degree of 2, for example, in the first-phase non-energized period Ta, the current values of the second-phase coil current 102 and the third-phase coil current 103 need to be identical to each other with the polarities opposite each other. This restriction makes it difficult to sufficiently reduce the vibration and noise of the motor including the non-energized periods.

According to the conventional configuration, the driving transistor for directly driving the neutral point of the "Y"-connected motor coils is not provided while the freedom degree of the three phase coil currents is 2, and therefore the residues of the vibration and the noise are sizable, that is, the residues are not sufficiently suppressed. Under constraints where, in the first-phase non-energized periods Ta and Te, both the current values, namely, the second-phase coil current 102 and the third-phase coil current 103, have the opposite polarities and the identical magnitudes, it can easily be inferred from the waveforms of the shaft direction force components attributed to the respective phase coil currents that the synthetic motor-shaft direction force 108 can never be sufficiently suppressed.

SUMMARY OF THE INVENTION

The invention is made to solve the problems described above. Accordingly, an object of the invention is to provide a motor driving apparatus and a motor driving method, wherein, for example, in a three-phase motor having non-energized periods, the freedom degree of three-phase current waveforms can be made to 3, and non-energized periods of respective phase coil currents for detecting a sensorless-motor rotor position are provided, so that the vibration and the noise are sufficiently reduced.

In order to achieve the above object, a motor driving apparatus according to one aspect of the invention drives a multiphase motor by controlling energization to motor driving coils of multiple phases. The apparatus comprises: a rotor position detector section for obtaining rotor position information by detecting back electromotive voltages induced in a motor driving coil of a non-energized phase; a half bridge circuit group including pairs of high-potential-side driving transistors and low-potential-side driving transistors respectively connected to both terminals of the motor driving coils; a torque command signal generator section for generating torque command signals for motor driving in accordance with original torque command signals input from the outside and output signals of the rotor position detector section; an energization control signal generator section for generating energization control signals for driving each phase coil in accordance with the command signals generated by the torque command signal generator section; and an energization control section which is supplied with the energization control signals and controls the energization of the motor driving coils of the multiple phases at a predetermined cycle in accordance with the supplied energization control signals.

In this configuration, the energization control section sets an non-energized period during which only one motor driving coil of the motor driving coils of the multiple phases is set to an non-energized state, so that the motor driving is performed in a manner such that a total of coil currents of the multiple phases is not zero in the non-energized period.

In the configuration described above, preferably, the motor driving coils of the multiple phases include a neutral point of star-connected common connection terminal, and the half bridge circuit group includes the high-potential-side driving transistors and the low-potential-side driving transistors that are connected also to the side of the neutral point terminal. In the cases of linear voltage driving and voltage PWM driving, the torque command signal generator section generates voltage target values of the coil terminals of the respective phases and the neutral point. For the linear current driving, the torque command signal generator section generates current target values of the coil terminals of the respective phases and the neutral point. For the PWM driving, the torque command signal generator section generates the target current values of the respective phases and a flow-out/in current of the neutral point and the target current value of the total currents obtained by synthesizing thereof. Thereby, motor driving for the neutral point terminal is performed in the non-energized period during which the coil current of any of the phases is set to zero.

A motor driving method according to another aspect of the present invention drives a multiphase motor by controlling energization of motor driving coils of multiple phases and by performing driving control of high-potential-side driving transistors and low-potential-side driving transistors. The method comprising the steps of: obtaining rotor position information by detecting back electromotive voltages induced in a motor driving coil of a non-energized phase; generating torque command signals for motor driving in accordance with original torque command signals input from the outside and the obtained rotor position information; generating energization control signals for driving each phase coil in accordance with the generated torque command signals; and controlling the energization of the motor driving coils of the multiple phases at a predetermined cycle in accordance with the energization control signals.

In this method, in the energization controlling step, there is set an non-energized period during which only one motor driving coil of the motor driving coils of the multiple phases is set to an non-energized state, so that the motor driving is performed in a manner such that a total of coil currents of the multiple phases is not zero in the non-energized period.

The motor driving apparatus and the motor driving method according to the invention individually include the cases of the linear driving and the PWM driving. In the case of the PWM driving, pulse modulation control signals to be described in the embodiments are used for the energization control signals.

According to the invention, with the configuration described above, in a non-energized period of a coil of a certain phase, when forces acting in the shaft direction induced by the coil current of the other phases are synthesized, vibration components of the forces acting in the shaft direction are cancelled from one another. Thereby, in total, the vibration and noise can be suppressed, and the motor driving apparatus and the motor driving method having the functionalities of reducing vibration and noise can be implemented.

BRIEF DESCRIPTION OF THE DRAWINGS

In the accompanying drawings:

FIGS. 6A and 6B are views descriptive of driving of other two phases and a neutral point in the case where one phase is in a non-energized period which is being adapted to the respective embodiment of the invention;

DETAILED DESCRIPTION OF THE PREFERRED EMBODIMENTS

Figure 2:
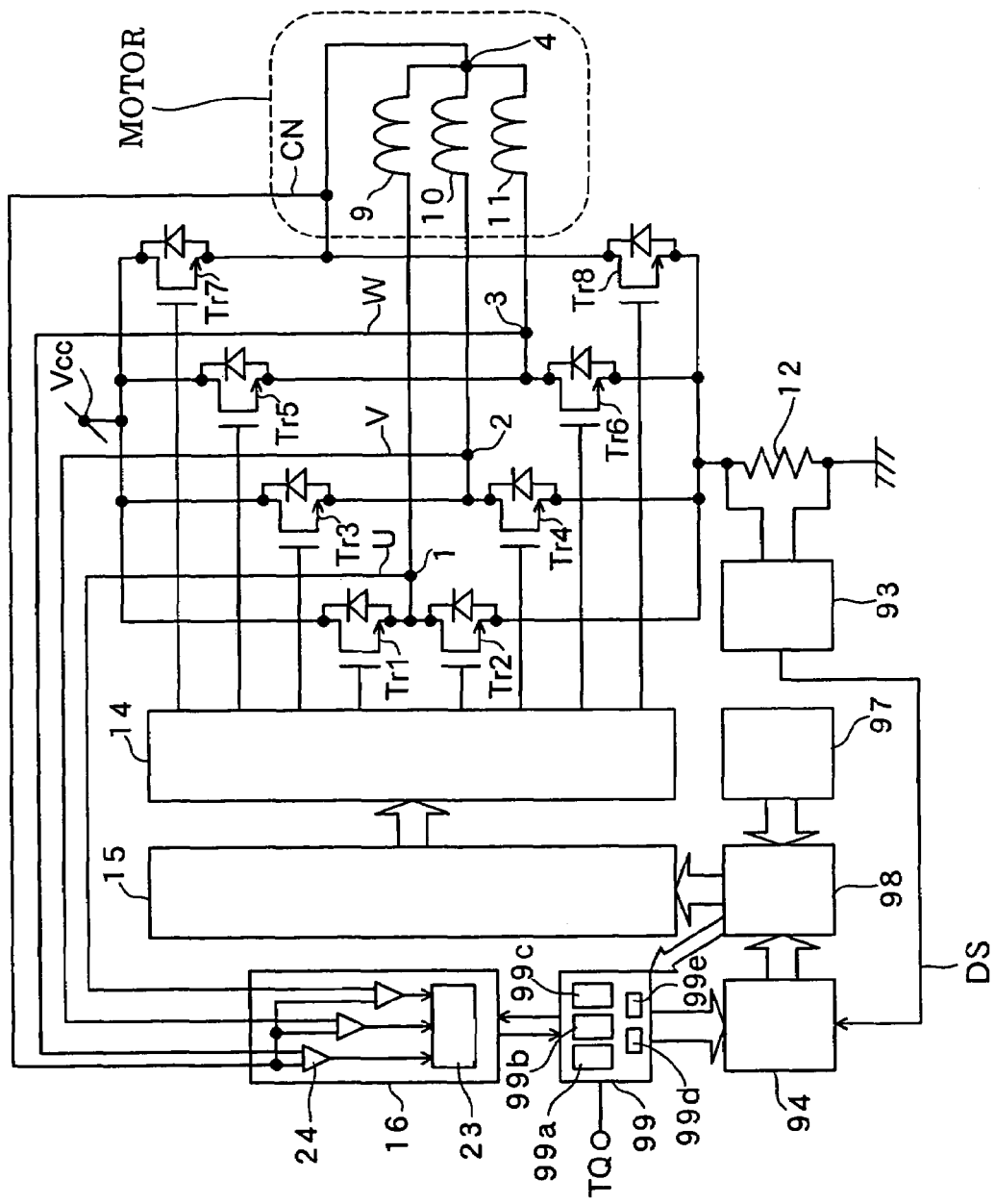
FIG. 2 is a circuit diagram showing a motor driving apparatus according to an embodiment 2 of the invention.
Figure 3:
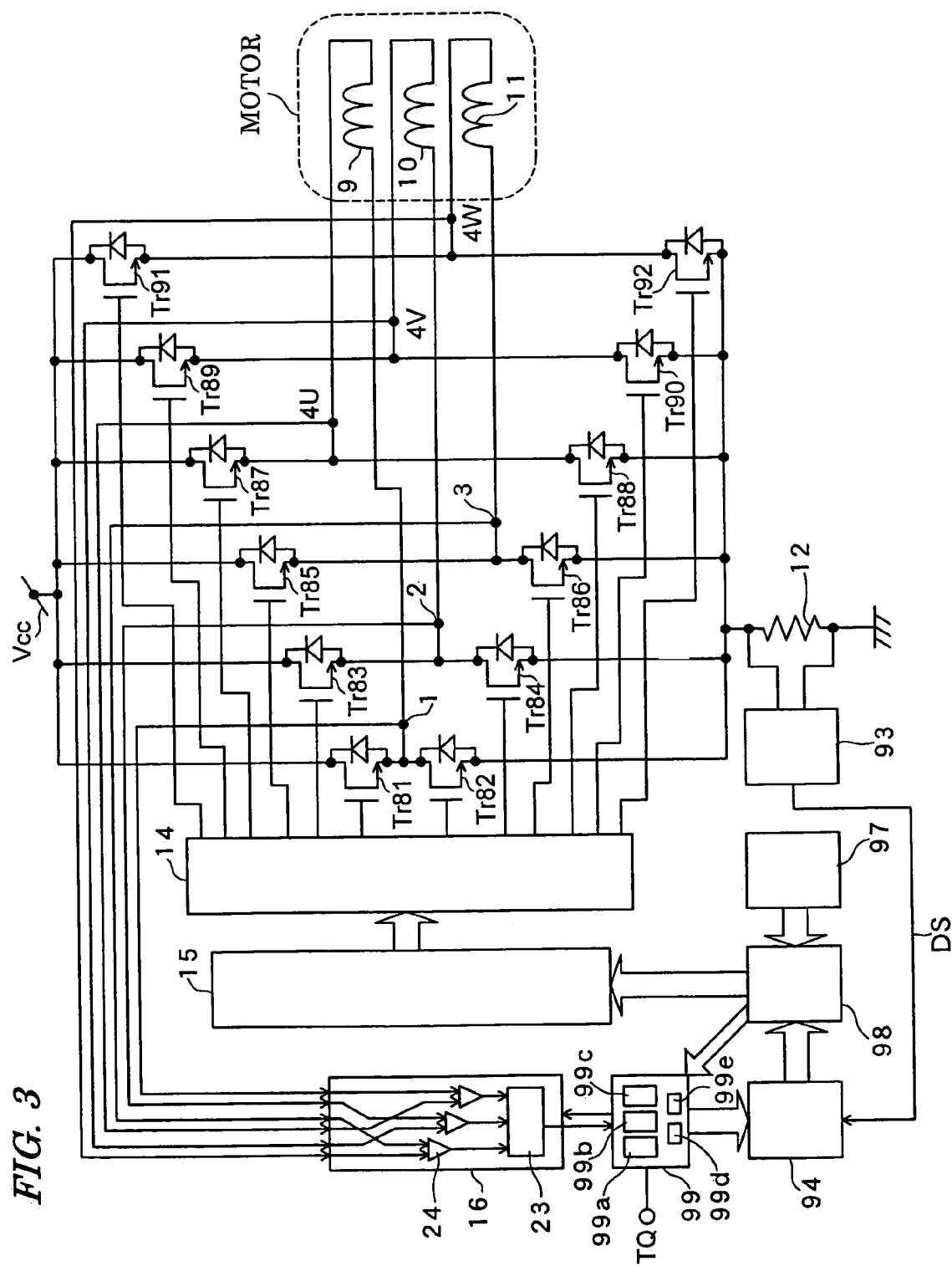
FIG. 3 is a circuit diagram showing a motor driving apparatus according to an embodiment 3 of the invention.

Embodiments of the invention will be described herebelow referring to the accompanying drawings. Common elements in the individual drawings are shown using the same characters, and repeated descriptions are omitted herefrom. Generally, PWM (pulsewidth modulation) driving methods, linear driving methods, and the like methods are widely used for motor driving. The PWM driving method includes a type termed a "voltage PWM driving method," which pulsewidth modulates weighted voltage values in a configuration as shown in FIG. 1, and a type termed "current PWM driving method," which directly controls a current value in units of a respective driving transistors as shown in FIGS. 2 and 3 described below.

According to the voltage PWM driving method, a plurality of torque command signals are pulsewidth-modulated using a triangular wave signal, wherein each of the torque command signals has an amplitude defined in accordance with an amplified output of an error between a mean voltage (mean current) of a shunt resistor and an original torque command value TQ. The plurality of torque command signals are, for example, three phase signals when neutral point driving is not performed, or signals with which, using one phase set to a reference potential, when a combination of the remaining two phases causing the potential difference to vary with respect to the reference potential is alternated in units of 120°. When the neutral point driving is performed, the torque command signals are obtained by modulating four signals consisting of three phase signals and the neutral point signal. Alternatively, the torque command signals are obtained by dividing an interval, wherein one phase is set to a reference potential in units of the divided intervals, and the other phase signals are set as signals having voltage values as relative differences so that the signals are modulated. In comparison, the current PWM driving method is a method that uses a PWM scheme, wherein multiple command signals of amplitudes proportional to the original torque command values TQ are formed, so that switch-off is performed upon detection of a match between the respective command and the current of the shunt resistor in time division. The multiple command signals include three phase coil currents, neutral-point flow-out/in current, and a current obtained by summing a plurality of currents thereamong.

EMBODIMENT 1

Figure 1:
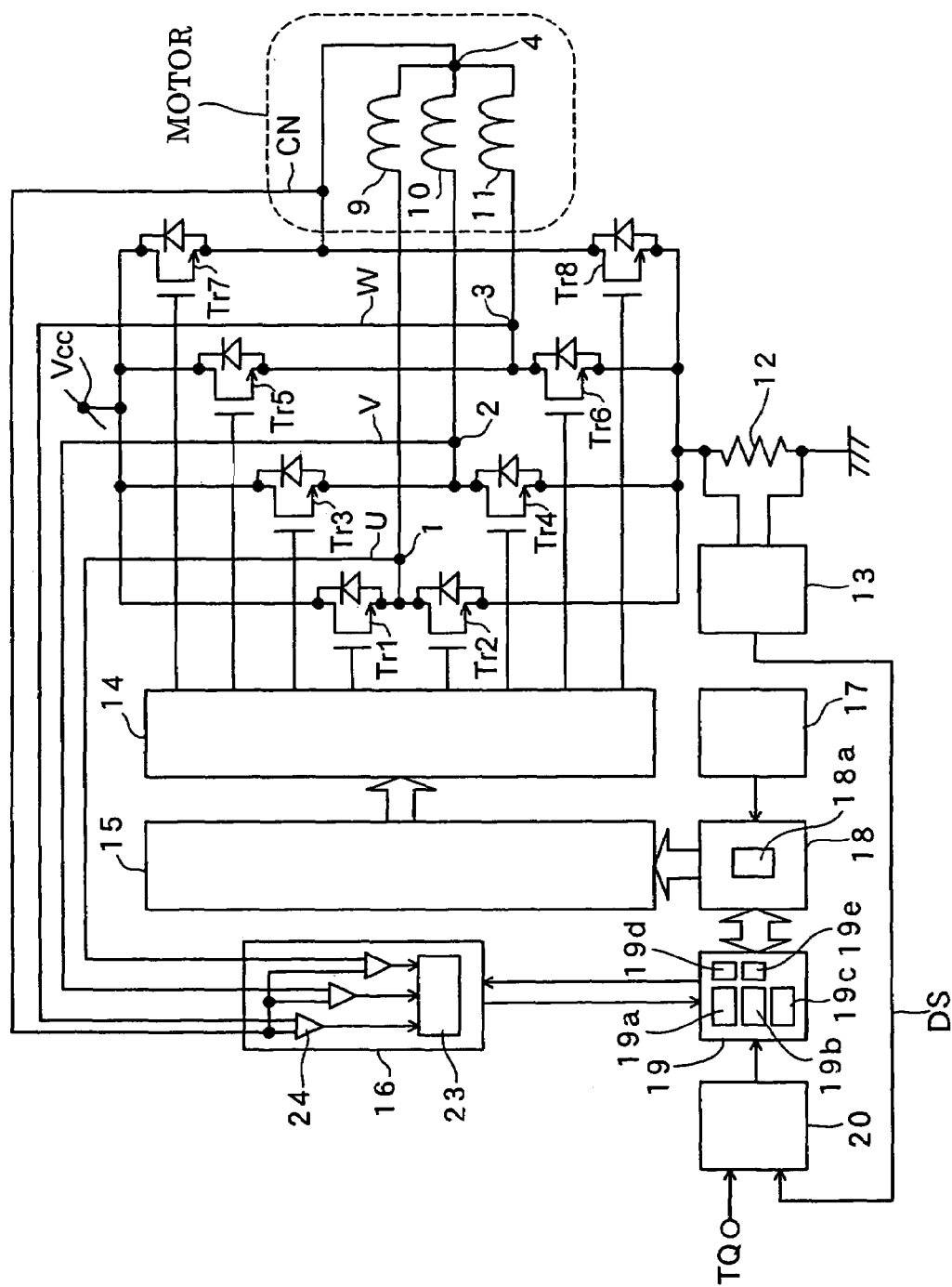
FIG. 1 is a circuit diagram showing a motor driving apparatus according to an embodiment 1 of the invention.

FIG. 1 shows an essential portion of a circuit configuration of a motor driving apparatus according to the embodiment 1 of the invention. The motor driving scheme of the invention is characterized as follows. Multiple phase motor driving coils include a neutral point working as a star-connected common connection terminal. A half bridge circuit group includes high-potential-side and low-potential-side transistors in pairs connected also to the neutral point terminal side. It is noted here that the term "half bridge circuit group" indicates a plurality of half bridge circuits each including a pair of high-potential-side and low-potential-side transistors in series in the description. During an non-energized period wherein only one motor coil of the multiple phase motor driving coils is set to a non-energized state, a driving current is also applied to the neutral point terminal. During an all-coil energized period wherein the current is flowed to all the motor driving coils, the neutral point set to the non-energized state wherein driving current is not applied to the neutral point terminal.

Referring to FIG. 1, Tr1 and Tr2, respectively, denote a high-potential-side driving transistor and low-potential-side driving transistor connected in common to a terminal 1 of a motor coil 9 of a first phase (U phase). Tr3 and Tr4, respectively, denote a high-potential-side driving transistor and low-potential-side driving transistor commonly connected to a terminal 2 of a motor coil 10 of a second phase (V phase). Tr5 and the Tr6 denote a high-potential-side driving transistor and low-potential-side driving transistor commonly connected to a terminal 3 of the motor coil 11 of a third phase (W phase). Further, Tr7 and the Tr8, respectively, denote a high-potential-side driving transistor and low-potential-side driving transistor commonly connected to the neutral point terminal 4 to which the three motor coils 9, 10, and 11 are commonly "Y"-connected. The high potential side is a source current side (draw-out side of the respective phases) to which a current of a voltage Vcc is supplied; and the low potential side is a sink current side (draw-in side of the respective phases). A diode is connected between a drain and a source of each of the driving transistors in the direction along which regenerative current flows. In the case where the motor driving transistor is of the CMOS or DMOS type, the diode may be a parasitic diode existing between a body and a drain of the motor driving transistor.

Reference numeral 12 denotes a current-detecting shunt resistor for detecting the total current of the low potential-side driving transistors. Alternatively, the current detecting shunt resistor may be configured to detect the total current of the high-potential-side driving transistors. Reference numeral 13 denotes a current-detection amplifier section that amplifies both-end voltages of the current detecting shunt resistor 12; reference numeral 14 denotes a pre-drive section; reference numeral 15 denotes an energization switching section; reference numeral 16 denotes a rotor position detector section; reference numeral 17 denotes a triangular wave oscillator section; reference numeral 18 denotes a pulse modulation control signal generator section; reference numeral 19 denotes a torque command signal generator section for generating a torque signal in units of the respective phases; and reference numeral 20 denotes an error amplifier section. The error amplifier section 20 amplifies a difference between a signal obtained in accordance with a shunt-resistor inter-terminal potential difference and a signal obtained in accordance with an original torque command input signal TQ (also referred to as "torque command value," hereafter) being externally inputted.

The triangular wave oscillator section 17 is a circuit that generates a triangular wave signal for obtaining a timing of turning ON and OFF a PWM control signal of a neutral point output and three phase outputs of the pulse modulation control signal generator section 18. The pulse modulation control signal generator section 18 includes a comparator section formed of multiple comparators and performs a PWM control process to thereby generate PWM control signals, with which the energization switching section 15 applies the driving current to the neutral point terminal during the non-energized period, and does not apply the driving current to the neutral point terminal to be set in an non-energized state during the all-coil energized period in which the current is flowed through all the motor driving coils. As one embodiment of an interior configuration of the torque command signal generator section 19, the configuration may be formed to include an interval divider section 19a, a synthesizer section 19b, a phase control section 19c, an enable signal generator section 19d, a mode switching section 19e, and a counter (not shown) for obtaining a timing of a logic circuit (not shown) regarding the respective phase waveforms.

The divider section 19a divides the electrical angle of 360° into predetermined intervals of the electrical angle based on the rotor position information. The purpose of the division is to set a target value of a control amount, thereby performing appropriate and rational control in units of the predetermined intervals of the electrical angle. The synthesizer section 19b gives a voltage target value in units of the intervals to each of the phase coil terminals including the neutral point and generates a basic profile of the torque command signal, thereby generating the torque command signal formed by proportionally reflecting an output of the error amplifier section 20, to be supplied to the pulse modulation control signal generator section 18. The phase control section 19c is a phase shift means that is used when necessary. The mode switching section 19e performs a switching operation between a so-called start mode and a detection mode in the sensorless motor driving in accordance with the output set by the counter (not shown). With the torque command signal generator section 19 configured as described above, variations in the three voltages and the neutral point voltage with respect to phase angle variations are formed as signal waveforms having an amplitude proportional to the output from the error amplifier section 20, whereby various torque command signals are generated in synchronism with the cycle of rotor position signals (binary signals).

For example, a rotor phase detection signal inputted to the interval divider section 19a is divided in units of a predetermined electrical angle to generate divided signals, and the synthesizer section 19b allocates a predetermined voltage value corresponding to a thus-divided signal in units of a predetermined electrical angle interval in accordance with the rotor phase detection signal. Since the present embodiment is an example in the case of the voltage driving, the current waveform is delayed in phase relative to the voltage waveform. The phase control section 19c shifts the respective voltage waveforms generated by the synthesizer section 19b, by a predetermined value if necessary, thereby generating respective-phase dedicated input torque command signals. Thus, the phase of the fundamental wave of the respective phase coil currents can be matched with the respective phase torque constant waveforms represented by a sine wave. Further, a countermeasure can be taken to suppress the vibration and the noise in the shaft-direction force constant waveform in units of the respective phase coil currents represented by a sine wave delayed in phase by an electrical angle of 90° from the respective torque constant waveform.

The enable signal generator section 19d is provided to output the timing signal to the rotor position detector section in order to prevent an error in the back-electromotive-voltage detection of a back electromotive voltage working as the rotor position signal from occurring because of, for example, a switching noise transferred from the driving transistors. The enable signal generator section 19d uses a signal generated by the pulse modulation control signal generator section 18 in order to generate the timing signal. The mode switching section 19e determines whether or not to perform commutation in accordance with the back electromotive voltage by determining whether or not the back electromotive voltage increases to a sufficient level. If not in accordance with the back electromotive voltage, the mode enters the start mode. Although the operation of the start mode is not described herein in detail, such a method is well known as that, for example, synchronized operations are performed using commutation with a predetermined cycle until the back electromotive voltage reaches a detectable level, and the driving current is applied to an appropriate phase predicted from a response signal to an input of a rotor position searching pulse.

The operation of the motor driving apparatus shown in FIG. 1 will be described herebelow. Three phase motor coil terminal voltages and a neutral point terminal voltage are inputted to the rotor position detector section 16. Specifically, the voltage signal of the common connection node 1 of the transistors Tr1 and Tr2, the voltage signal of the common connection node 2 of the transistors Tr3 and Tr4, the voltage signal of the common connection node 3 of the transistors Tr5 and Tr6, and the voltage signal of the common connection node 4 of the transistors Tr7 and Tr8 are inputted to the rotor position detector section 16. Then, the inter-terminal potential difference in the non-energized period of each motor coil is compared by the comparator 24, and a proper signal is extracted by the logic circuit 23 from the comparator 24 using the enable signal received from the enable signal generator section 19d. Thus, the extracted signal is converted to a proper rotor phase information signal, and the rotor phase information is supplied to the respective-phase dedicated input torque command signal generator section 19.

More specifically, the rotor position detector section 16 compares the potential difference between the both terminals 1 and 4 of the motor coil 9 in the non-energized period of the motor coil 9 of the first phase (U phase), compares the potential difference between the both terminals 2 and 4 of the motor coil 10 in the non-energized period of the motor coil 10 of the second phase (V phase), and compares the potential difference between the both terminals 3 and 4 of the motor coil 11 in the non-energized period of the motor coil 11 of the third phase (W phase). Thereby, the rotor position detector section 16 detects the respective rotor positions. The rotor position detection method itself according to the back voltage detection method of detecting the inter-terminal back voltage of the respective coils in the non-energized period is well known, and is disclosed in the patent document 1, for example.

Since the current detecting resistor 12 (shunt resistor) is provided, the total current of all the low-potential-side driving transistor currents can be detected. The voltage across the current detecting shunt resistor 12 is amplified in inter-terminal potential difference by the current-detection amplifier section 13, and then smoothed. A difference between an output of the current-detection amplifier section 13 and the original torque command value TQ applied from a torque input terminal is amplified by the error amplifier section 20. The amplified output value from the error amplifier section 20 and the rotor position information outputted from the rotor position detector section 16 are inputted to the respective-phase dedicated input torque command signal generator section 19. In accordance with the position information applied from the rotor position detector section 16, the torque command signal generator section 19 generates torque command voltages for the respective three phases and the neutral point while being amplitude-modulated in proportion to the outputs of the error amplifier section 20.

The input torque command signals for the respective three phases and the neutral point, which are outputted from the torque command signal generator section 19, are compared with the output signal of the triangular wave oscillator section 17 in the comparator section 18a of the pulse modulation control signal generator section 18. After undergoing the PWM control process, the output pulse modulation control signals become three phase PWM control signals including a neutral-point driving current control signal, and then inputted to the energization switching section 15. The pulse modulation control signal creator section 18 additionally includes a function of, for example, generating the PWM signal having undergone a shoot-through prevention treatment in association with the comparison processing, and signal generation for the prevention of erroneous detection of the rotor position information, and a function of outputting the generated signals to the rotor position detector section 16.

The torque command signal generator section 19 generates various torque command signals for generating appropriate currents to the individual phase coils through the energization switching section 15.

As described above, in the voltage PWM driving, the target current waveform capable of reducing the shaft direction force is weighted as the voltage waveform for the respective phases using the means shown by the blocks 19 and 20 in FIG. 1, and the voltage waveform is compared with the triangular wave in the comparator section 18*a*. Thus, the waveform is replaced with a duty ratio to perform the PWM driving.

The energization switching section 15 is energization control means that, upon receipt of the pulse modulation control signals, performs the switch control of the energization of the multiple phase motor driving coils in a predetermined cycle in accordance with the input pulse modulation control signals. Herein, the switch control refers to functions including commutation control and duty control of the respective driving transistors. In accordance with a switch signal from the energization switching section 15, gate voltages are applied through the pre-drive section 14 to the driving transistors Tr1 to Tr8 to thereby perform ON/OFF control, whereby the current is flowed through the respective coils to thereby cause the rotation of the motor. With the above-described operation, the motor driving can be performed such that the currents in accordance with the torque command values TQ applied to the torque input terminal are flowed to the current detecting shunt resistor 12, and that the total current for exciting the respective coils is feedback controlled.

According to the above-described configuration of the preferred embodiment, in the operation of the current detecting shunt resistor & current-detection amplifier section (12, 13), the total current of all the high-potential-side driving transistor currents or all the low-potential-side driving transistor currents are detected, and in the period wherein all the coil currents are flowing, the neutral point is not driven and the output of the error amplifier section 20 is reflected onto the three phase voltage amplitudes, whereas in the non-energized period of one phase coil current being not flowing, the neutral point is driven to flow the current thereto and the output of the error amplifier section 20 is reflected onto the three phase voltage amplitudes and the neutral point voltage amplitude. Especially, the three phase voltage waveforms and neutral point voltage waveform in the non-energized period are set to be the three phase coil current waveforms with which the shaft direction force is cancelled. Depending on a gain relation between the input signal levels applied to the error amplifier section 20 and the TQ input terminal, the current detecting shunt resistor & current-detection amplifier section 13 is sufficient as long as having a smoothing effect, but need not have an amplifying effect.

In the motor driving apparatus in FIG. 1, the driving transistors Tr7 and Tr8 are connected to the neutral point terminal side, so that the neutral point driving current for driving the neutral point 4, which is the common connection node of the respective coils 9, 10, and 11, can be flowed through a current line CN. This implies that the sum total of the three phase coil currents is possible to pass through the transistor Tr7 or Tr8, so that the total of the respective phase coil currents need not be zero, and the three phase coil currents can be flowed independently of one another.

In the above-described configuration of the present embodiment, the comparator section 18*a* of the pulse modulation control signal generator section 18 functions as the pulse modulation control signal generator section that generates the pulse modulation control signals in accordance with the torque command signal generated by the torque command signal generator section 19 to the respective phases and the neutral point; and the pulse modulation control signals are inputted through the energization switching section 15, and the energization switching is performed to set the non-energized period wherein only one phase motor driving coil of the multiple motor driving coils enters the non-energized state, wherein in the non-energized period, energization control is performed to cause inflow or outflow of the currents with respect to the neutral point terminal of the motor driving coils.

Thus, in accordance with the input pulse modulation control signals, the energization of the respective motor driving coils is switch-controlled such that, in the period wherein only one-phase motor driving coil of the multiple motor driving coils is in the non-energized state, and the other two phase motor driving coils are all in the energized state, wherein the currents are flowed to cause inflow or outflow with respect to the neutral point terminal.

On the other hand, in the all-coil energized period wherein the currents are flowed to all the motor driving coils, energization switching section (15) performs the switch control of the energization so as not to cause inflow or outflow of the currents with respect to the neutral point terminal to be set in the non-energized state.

In the configuration of FIG. 1, the weighting voltages for the transistors Tr1 to Tr8 that drive the U, V, and W phase terminals 1, 2, and 3 and the neutral point 4 in accordance with the electrical angle phase information being input from the rotor position detector section 16 are compared with the triangular waves received from the triangular wave oscillator section 17 in the comparator section 18*a* of the pulse modulation control signal generator section 18, whereby the PWM driving signals for the transistors Tr1 to Tr8 are generated to thereby perform the motor driving.

Thus, the configuration is formed to enable the three phase coil currents to be set independently of one another, wherein respective-phase dedicated input torque command signal generator section 19 optimizes the output waveforms thereof in the manner that, as shown in FIGS. 5 and 7 to 10 described below, for example, in the period wherein one phase becomes non-energized for the rotor position detection, the remaining two phase current profiles are optimized, thereby to enable the configuration of FIG. 1 to sufficiently cancel the vibration components of the shaft direction forces and to thereby implement vibration reduction and noise reduction. The configuration of FIG. 1 pulsewidth modulates the weighted voltage values, so that the configuration is rendered as the embodiment related to the voltage PWM driving, wherein waveforms for optimizing the current profiles can be preset in the synthesizer section 19*b*. The current profiles may be of the type variable corresponding to the magnitude of either the rotational speed or the original torque command value.

If a function that performs digital operation processing to generate weighted PWM signals for the respective phases is added to the respective-phase dedicated input torque command signal generator section 19, the triangular wave oscillator section 17 and the comparator section 18*a* can be omitted, and vibration reduction and noise reduction can be implemented even in this case.

In the present embodiment, there is shown the case where the phases of the respective phase current waveform is matched with the phases of the torque constant waveform. However, according to the invention, the setting of the phase difference between the two need not necessarily be limited to the zero degree, but driving can also be performed with the phase difference being maintained at a substantially constant angle.

EMBODIMENT 2

In comparison to the voltage PWM driving embodiment shown in FIG. 1, FIG. 2 shows an embodiment of current PWM driving. In the current PWM driving, after turning ON the driving upon receipt of a PWM ON pulse, it is detected by a comparator that currents to be verified have reached target values, and then the PWM driving is turned OFF. Specifically, in the current PWM driving, the multiple currents to-be-verified are turned ON in PWM at predetermined timings, and the values of the currents are time-divisionally compared and controlled so as to be turned OFF in PWM. In the case where plural currents among the three phase coil currents and neutral-point flow-out/in current are flowing, a total-value current of the plural currents is also included in the multiple currents to-be-verified. When a current value becomes equal to a sum of the respective current target values composing the total-value current, one or both of the currents are turned OFF in PWM thereby to perform the control of the PWM driving. In FIG. 2, portions shown by the same characters or numerals as those in FIG. 1 have the same functions as those in FIG. 1, and descriptions of duplicate configurations and operations will be omitted herefrom for the sake of simplification. Referring to FIG. 2, reference numeral 12 denotes a current detecting (shunt) resistor, reference numeral 93 denotes an amplifying section for amplifying a voltage of the current detecting shunt resistor, reference numeral 14 denotes a pre-drive section, reference numeral 15 denotes an energization switching section, reference numeral 16 denotes a rotor position detector section, reference numeral 97 denotes a PWM-ON pulse generator section, reference numeral 94 denotes a comparator section, reference numeral 98 denotes a PWM latch section for generating pulse modulation control signals to perform the PWM control process, reference numeral 99 denotes a torque command signal generator section, TQ denotes an original input torque command signal, and Vcc denotes a motor power supply terminal. The torque command signal generator section 99 generates torque signals equivalent to the target currents values of the respective phases including the neutral point and to the total values thereof.

The PWM latch section 98 time-divisionally starts the energization of the respective phase coils or the neutral point in a predetermined procedure upon receipt of the PWM ON pulses from the PWM-ON pulse generator section 97, and receives a PWM OFF pulse indicative of reaching the target current value from the comparator section 94 to perform the PWM control process. Thus, the PWM latch section 98 generates the PWM control signals for controlling the energization switching of the energization switching section 15 such that, the neutral point terminal is energized by applying the driving current to the neutral point terminal in the non-energized period, and the neutral point terminal is set to a non-energized state by non-energizing the neutral point terminal in the all-coil-energized period wherein the currents are flown through all the motor driving coils.

An interior configuration of the torque command signal generator section 99 is formed, for example, to include an interval divider section 99a, a synthesizer section 99b, a phase control section 99c functioning as phase shift means if necessary, an enable signal generator section 99d and a mode switching section 99e. The configuration further includes a logic circuit (not shown) and a counter (not shown) that is used to obtain timings of the respective phase waveforms, so that various torque command signals are generated in synchronism with the cycle of the rotor position (or phase) detection signals.

For example, a rotor position detection signal (binary signal) inputted to the interval divider section 99a is divided by a predetermined electrical angle to generate divided signals, the synthesizer section 99b allocates a predetermined voltage value individually to the thus-divided signals in units of the predetermined electrical angle interval in accordance with the rotor position detection signal. The phase control section 99c phase-shifts the respective voltage waveforms generated by the synthesizer section 99b by a predetermined value by necessity to thereby generate respective-phase dedicated input torque command signals. Thus, the phases of the fundamental wave of the respective phase coil currents can be matched with the respective phase torque constant waveforms each represented by a sine wave. Further, the vibration and noise can be suppressed by adjusting the shaft-direction force constant waveform in each of the respective phase coil currents represented by a sine wave delayed in phase by an electrical angle of 90° from the respective torque constant waveforms. It is noted here that, since the present embodiment employs the current PWM driving, substantially no delay takes place in the current phase. The phase control section 99c is used in, for example, a case where the current is advanced in phase relative to the rotor position timing to perform motor driving in a high speed rotation zone for field-weakening control.

The enable signal generator section 99d is provided to output the timing signal to the rotor position detector section 16 in order to prevent an error in detecting a back-electromotive voltage working as the rotor position signal from occurring because of, for example, switching noises transferred from the driving transistors. The enable signal generator section 99d generate the timing signal using a signal generated by the PWM latch section 98. The mode switching section 99e determines whether or not to perform commutation in accordance with the back electromotive voltage by determining the back electromotive voltage increases to a sufficient level. If not in accordance with the back electromotive voltage, the mode enters the start mode. Although the operation of the start mode is not described in detail, such an operation is a well known method such that, for example, synchronized operations are performed using commutation with a predetermined cycle until the back electromotive voltage reaches a detectable level, and an appropriate phase coil is predicted to be energized based on a response signal to an input of a rotor position searching pulse.

The operation of FIG. 2 is as described herebelow. Three phase motor coil terminal voltages and a neutral point terminal voltage are inputted to the rotor position detector section 16. Namely, the voltage signal of the common connection node 1 of the transistors Tr1 and Tr2, the voltage signal of the common connection node 2 of the transistors Tr3 and Tr4, the voltage signal of the common connection node 3 of the transistors Tr5 and Tr6, and the voltage signal of the common connection node 4 of the transistors Tr7 and Tr8 are inputted to the rotor position detector section 16. Phase information is supplied from the rotor position detector section 16 to the torque command signal generator section 99. The rotor position detector section 16 compares the potential difference between the both terminals 1 and 4 of the coil 9 in the non-energized period of the coil 9, compares the potential difference between the both terminals 2 and 4 of the coil 10 in the non-energized period of the coil 10, and compares the potential difference between the both terminals 3 and 4 of the coil 11 in the non-energized period of the coil 11. Thereby, the rotor position detector section 16 detects the respective rotor positions. The torque command signal generator section 99 receives the original input torque command signals TQ inputted to the input terminal, varying them to be torque command signals in accordance with the phases using the three phase coil currents and neutral-point input/output currents as the target values and using the current value obtained by adding two target current values thereamong as the target value, based on the phase information supplied from the rotor position detector section 16.

The torque command signal generator section 99 generates multiple current target values to be supplied to the comparator section 94 in order to energize the three phase coils by applying the driving currents thereto. Voltages across the current detecting shunt resistor 12 are amplified by the amplifying section 93 and transferred to the comparator section 94. The PWM-ON pulse generator section 97 generates pulses for selection of the transistors Tr1 to Tr8 for the respective coils including the neutral point and for starting the PWM driving, and the generated pulses are supplied to the PWM latch section 98. The comparator section 94 compares the target values of the currents to be flown to the driving transistors Tr1 to Tr8 and the outputs from the voltage amplifying section 93, and when the outputs from the voltage amplifying section 93 exceed the target values of currents, the comparator section 94 outputs the PWM OFF pulse to be supplied to the PWM latch section 98. This operation is time-divisionally performed, thereby performing the current PWM control of the driving transistors Tr1 to Tr8.

The PWM latch section 98 outputs a latch on/off signal to be supplied to the energization switching section 15 wherein the output signal has a latch-on function upon reception of the PWM ON pulse from the PWM-ON pulse generator section 97 and has a latch-off function upon receipt of the PWM OFF pulse from the comparator section 94. The energization switching section 15 generates energization switching signals, so that the driving transistors Tr1, Tr2, Tr3, Tr4, Tr5, Tr6, Tr7, Tr8 are driven through the pre-drive section 14 to thereby rotate the motor. By this operation, the motor driving can be performed in a manner that the original input torque command signals TQ inputted to the torque input terminal are distributed to the current control of the respective coils. In a period in which an non-energized phase according to the invention is not present, the motor driving can be performed by using the method as described in the Patent Document 2 (Publication No. 2003-174789). The PWM latch section 98 performs, for example, sequential allocation of the signals received from the PWM-ON pulse generator section 97 to the PWM ON operations of the respective phase driving transistors, and generates a PWM signal having undergone a shoot-through prevention treatment. The PWM latch section 98 further generates a signal for prevention of erroneous detection of the rotor position information and the generated signal is supplied to the rotor position detector section 16. It is noted here that, depending on a gain relation with respect to the level of the input torque signal inputted to the torque input terminal, the current detecting shunt resistor voltage amplifying section 93 may be omitted in the configuration.

Since the motor driving apparatus shown in FIG. 2 includes the transistors Tr7 and Tr8 connected to the neutral point terminal, it is possible to drive the neutral point 4 which is the common connection node of the respective coils 9, 10, and 11. This implies that the sum total of the three phase coil currents is able to pass through the transistor Tr7 or Tr8, so that the values of the currents flowing to the three phase coils can be flowed independently. According to the Patent Document 2, one phase coil terminal, except for the neutral point 4, is fixed to one of the high potential or the low potential, and driving transistors for the remaining two phase coil terminals are alternately time-divisionally turned ON to reach the respective target current values, or the total current value of the two phases is controlled to reach the total value of the respective two phase target currents, so that the two phase coil current values are controlled, and the opposite-sign current obtained by summing the two phase currents is set as the current of the potential-fixed coil.

In the period where an non-energized phase is present, the control of the driving current of the neutral point 4 and of two phases, i.e., total three currents can be implemented by adapting the method described in the Patent Document 2. In FIG. 2, the currents are flowed to the transistors Tr1 to Tr8 for driving the respective phase coils and the neutral point in accordance with the electrical angle phase information received from the rotor position detector section 16, and the PWM ON times of the transistors Tr1 to Tr8 are controlled by time-divisionally controlling the voltages of the current detection resistor 12 thereby to perform the motor driving.

More specifically, in the coil having a greater current value among the energized coils, a terminal located in the side different from the neutral point 4 side is fixed to either the high or low potential depending on whether the terminal acts as a current source or current sink. The driving transistors connected to the terminal of a coil having a less current value located at the side different from the neutral point 4 and the driving transistors connected to the neutral point 4 are alternately time divided to be set to the ON state, thereby to cause the respective terminals to reach the target current values to be flowed-in or flowed-out. The total of the less-current coil current and the current flowing out or flowing in the neutral point 4 is an equal value to that of a current of the greater-current coil. The target current values are individual current target values in the divided time wherein the coil current having a less-current and the neutral-point flow-out/in current are independently controlled in energization. On the other hand, in a divided time wherein the both currents are in parallel energized and controlled, the total of the both currents controlled in energization in parallel is used as the target current value.

The target current value is a value set as a target to which the respective phase coil currents and neutral-point flow-out/in currents are to be controlled in accordance with the torque command signal. When one coil terminal at the side different from the neutral point side is fixed to either the high potential or the low potential and the remaining two coil currents are energized in parallel, or when one coil is non-energized and remaining one coil current and the current input/output at the neutral point are parallel energized, the synthesized current value of the parallel-energized currents can be expressed as "synthesized torque command signal". Thus, the configuration is formed to enable the three phase coil currents to be set independently of one another, wherein in the period wherein one phase becomes non-energized for detecting the rotor position, the remaining two phase current profiles are optimized, so that it is possible for the configuration of FIG. 2 to sufficiently cancel the vibration components of the shaft direction forces and to thereby implement vibration reduction and noise reduction. The configuration of FIG. 2 performs the PWM driving directly controlling the current value in units of the respective driving transistors, so that the configuration is rendered as the embodiment related to the current PWM driving.

EMBODIMENT 3

FIG. 3 shows a motor driving apparatus wherein both terminals of each of three phase coils 9, 10, and 11 of a motor are formed independently, instead of providing a neutral point of a common connection node of the respective coils 9, 10, and 11. The coil 9 is connected between a common connection node 1 of driving transistors Tr81 and Tr82 and a common connection node 4U of driving transistors Tr87 and Tr88, the coil 10 is connected between a common connection node 2 of transistors Tr83 and Tr84 and a common connection node 4V of driving transistors Tr89 and Tr90, and the coil 11 is connected between a common connection node 3 of transistors Tr85 and Tr86 and a common connection node 4W of driving transistors Tr91 and Tr92.

Other block configurations are the same as those shown in FIG. 2, so that descriptions thereof are omitted here. In this configuration, the respective three phase coils can be energized with currents independent of one another, and in the period where one phase coil becomes non-energized for detecting a rotor position, current profiles of the remaining two phases are optimized, and the vibration components in the shaft-direction forces are sufficiently cancelled, so that the vibration and noise can be reduced. Since the configuration of FIG. 3 performs the PWM driving directly controlling the current values in each of the driving transistors, the configuration is rendered as an embodiment related to a current PWM driving. In this embodiment 3, since no neutral point is present, the potential difference of the current detecting shunt resistor 12 is time-divided, and using the time-divided potential difference, the control of the three phase coil currents including the control of the target total current value during energization in parallel with the three coil currents may preferably be time-divisionally performed.

In the case of FIG. 3, description has been made regarding the control as the current PWM driving, similarly as the case of FIG. 2. However, even in a configuration wherein, instead of the blocks 94, 97, 98, and 99, the control blocks 17, 18, 19, and 20 for the voltage PWM driving described in the embodiment 1 in FIG. 1 are combined, the vibration components of the shaft direction forces can be sufficiently cancelled to thereby enable vibration reduction and noise reduction, and therefore such a configuration is also included in the present invention. As another way of configuring the voltage PWM driving, when the function of performing the digital operation processing to generate weighted PWM signals for the respective phases is added to a torque command signal generator section 99, the triangular wave oscillator section 17 and the comparator section 18a can be omitted from the configuration format in which the voltage PWM driving shown in FIG. 1 is combined in the embodiment 2.

EMBODIMENT 4

Figure 4A:
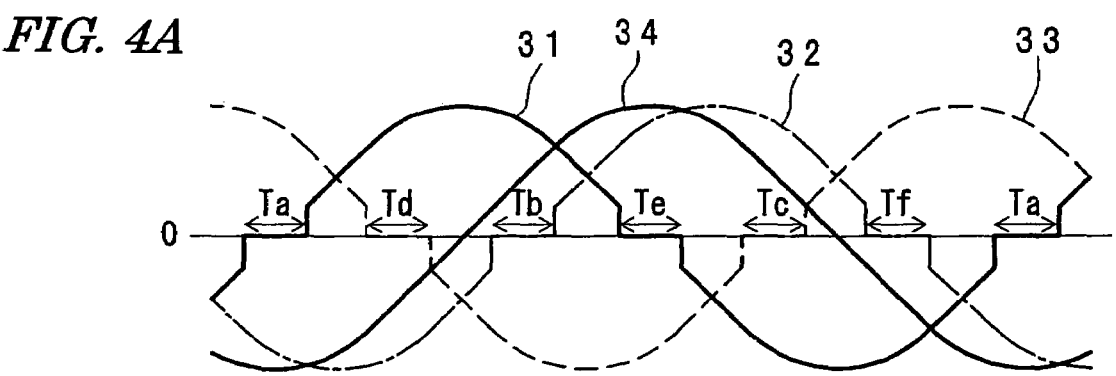
FIGS. 4A, 4B and 4C are views showing coil current waveforms, shaft direction magnetic flux variation curves, and shaft direction forces, respectively, in the case where only zero-crossing neighborhoods of a sine-wave shaped coil current are non-energized.

In the embodiments 1 to 3, description has been made that, when the freedom degree of the three phase coil currents can be made to 3, the vibration reduction and noise reduction can be implemented. However, the condition of the freedom degree 3 of the three phase coil currents is a necessary condition, but is not a sufficient condition. This will be explained herebelow referring to FIGS. 4A to 4C. In FIG. 4A, reference numerals 31, 32, and 33, respectively, denote first phase, second phase and third phase coil current waveforms. Since the total of the three phase coil currents is not zero in the periods Ta, Tb, Tc, Td, Te, and Tf wherein any one phase is non-energized, the three phase currents are independent of one another during the non-energized period.

In the periods other than the non-energized period, each of the phase coil currents has a sine-wave shaped waveform. Reference numeral 34 denotes a waveform of a first phase magnetic flux variation rate relative to the motor-shaft direction displacement, and the waveform 34 is approximately represented in the form of a sine wave that is different in phase by an electrical angle of 90° from the first-phase coil current. The product of the multiplication of the coil current 31 times the magnetic flux variation rate 34 represents a motor-shaft direction force with respect to the first phase. Although not shown in the drawings, a waveform of a second-phase magnetic flux variation rate relative to the motor-shaft direction displacement is approximately represented in the form of a sine wave that is different in phase by an electrical angle of 90° from the second-phase coil current 32, and the product of the multiplication of the both values represents a motor-shaft direction force with respect to the second phase.

Similarly, although not shown in the drawings, a waveform of a third-phase magnetic flux variation rate relative to the motor-shaft direction displacement is approximately represented in the form of a sine wave that is different in phase by an electrical angle of 90° from the third-phase coil current 33, and the product of the multiplication of the both values represents a motor-shaft direction force with respect to the third phase. Motor-shaft direction forces with respect to the first, second, and third phases are shown by reference numerals 35, 36, and 37 in FIG. 4B, respectively. A synthetic motor-shaft direction force obtained by summing the three phase motor-shaft direction forces 35, 36, and 37 is shown by reference numeral 38 in FIG. 4C. As can be known from the waveform 38 in FIG. 4C, in the non-energized periods Ta, Tb, Tc, Td, Te, and Tf, the vibration components of the shaft direction forces remain uncancelled, thereby producing residues of the vibration and the noise.

Figure 4B:
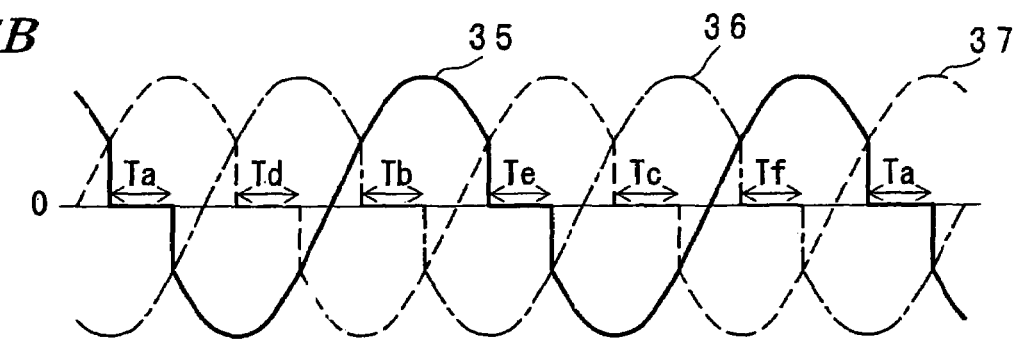
Figure 4C:
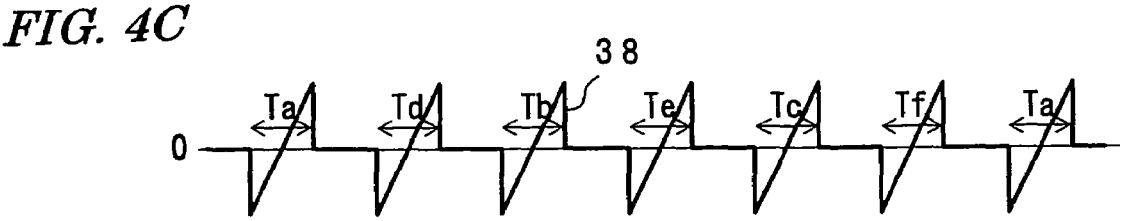
Figure 5A:
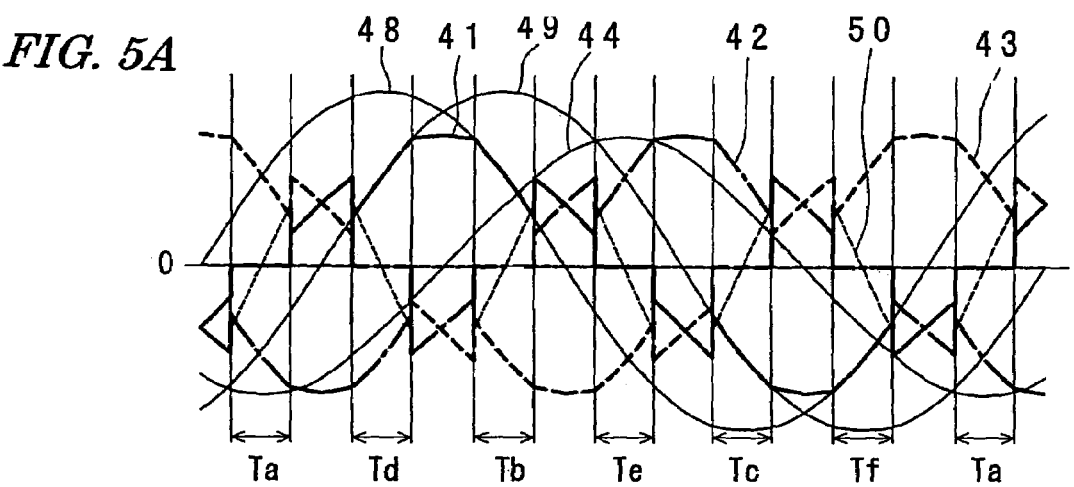
FIGS. 5A, 5B and 5C are views descriptive of a motor driving method relative to the coil current in an embodiment 4 of the invention.

The solution example of the above problems shown in FIGS. 4A to 4C will be described herebelow with reference to FIGS. 5A to 5C. In FIG. 5A, reference numerals 41, 42, and 43, respectively, denote first phase, second phase and third phase coil current waveforms, wherein since the total of the three phase coil currents is not zero in the periods Ta, Tb, Tc, Td, Te, and Tf of any one phase being non-energized, the three phase currents are independent of one another during the non-energized periods. Reference numeral 44 denotes a waveform of a first phase magnetic flux variation rate relative to the motor-shaft direction displacement, and the waveform 44 is approximately represented in the form of a sine wave that is different in phase by an electrical angle of 90° from the first-phase coil current.

The product of the multiplication of the coil current 41 and a magnetic flux variation rate 44 relative to the motor-shaft direction displacement represents a motor-shaft direction force with respect to the first phase. Although not shown in the drawings, the second-phase magnetic flux variation rate relative to the motor-shaft direction displacement is approximately represented in the form of a sine wave that is different in phase by an electrical angle of 90° from the second-phase coil current 42, and the product of the multiplication of the two values represents a motor-shaft direction force with respect to the second phase. Similarly, although not shown in the drawings, a third-phase magnetic flux variation rate relative to the motor-shaft direction displacement is approximately represented in the form of a sine wave that is different in phase by an electrical angle of 90° from the third-phase coil current 43, and the product of the multiplication of the both values represents a motor-shaft direction force with respect to the third phase.

The following describes the remaining two phase current waveforms other than the non-energized phase in the periods Ta, Tb, Tc, Td, Te, and Tf. For example, in the period Td wherein the third-phase coil current 43 is in the non-energized state, the shaft direction force in accordance with the first phase coil current 41 corresponds to the product of the multiplication of the magnetic flux variation rate 44 and the magnetic flux variation rate 41 relative to the motor-shaft direction displacement. As such, as the simplest way to obtain shaft direction forces having a shape symmetric with respect to an intermediate time point as a symmetry axis of the period Td, the first phase coil current waveform is formed into a shape 49 proportional to a sine wave advanced by 60° in phase from the phase of the sine wave of the magnetic flux variation rate 44 relative to the motor-shaft direction displacement. In this case, forming the waveform into the sine waveform shifted by 60° in phase implies the incorporation of a current profile having such a partial waveform into the first phase coil current. In other words, the above implies that when, in accordance with a rotor position signal, the phase angle is finely divided, a voltage value is allocated as a target current value in units of the respective phase angle, and the voltage (i.e., target current) is viewed as a waveform, the voltage has the sine waveform shape having a partially different phase. In the following description and mathematical expressions or equations, the unit of angle is indicated by degree (°).

A more specific description will be provided here referring to the case where, in a period wherein one phase is in the non-energized state, the current waveforms of the other two phases are represented by mathematical expressions. When the fundamental wave component of the above current waveforms is represented by $\sin(\theta)$, it can be said that in a period where the other phase is non-energized during a transition from a zero current level to the peak of the sine wave and in a period where the other phase is non-energized during a transition from the zero current level to the bottom of the sine wave, the current waveform is proportional to $\sin(\theta-30)$. On the other hand, it can be said that in a period where the other phase is non-energized during a transition from the peak of the sine wave to the zero current level and in a period where the other phase is non-energized during a transition from the bottom of the sine wave to the zero current level zero, the current waveform is proportional to $\sin(\theta+30)$. The current is preferably large to increase the rotational force.

Figure 5B:
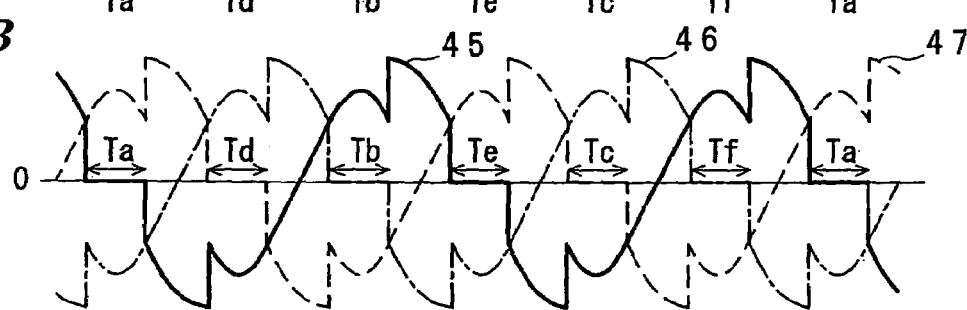
Figure 5C:
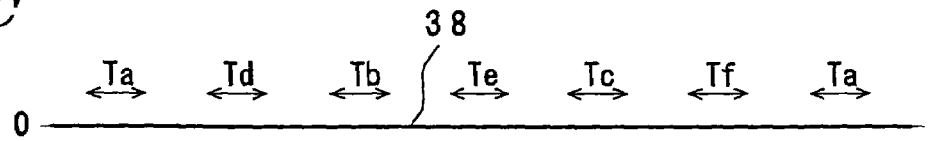

In the waveforms shown in FIGS. 5A to 5C, at the boundary with the interval having a higher current value of the adjacent intervals of the period Td, an appropriate scale factor is set such as to cause the current waveform to be continuous. However, this is not limited, and any one of various other scale factors may be used. The shaft direction force associated with the second-phase coil current 42 is represented by the product of the multiplication of the second phase magnetic flux variation rate, which is relative to the motor-shaft direction displacement represented by a sine waveform delayed by an electrical angle of 120° with respect to the magnetic flux variation rate 44, and the second-phase coil current. Accordingly, the second phase coil current waveform in the period Td has the shape proportional to a sine wave of the same phase as that of the first phase magnetic flux variation rate 44 relative to the motor-shaft direction displacement in order to obtain the shaft direction forces symmetric with respect to the intermediate time point as the symmetry axis of the period Td. By this wave formation, the shaft direction forces in the period Td are made symmetric with respect the zero axis and are hence cancelled by each other.

Likewise, in the period Tb, the third phase coil current waveform and the first phase coil current waveform, respectively, have a sine wave advanced by 180° in the phase of the first phase magnetic flux variation rate 44 relative to the motor-shaft direction displacement and a sine waveform 48 advanced by 120° in the aforementioned phase. In the period Te, the second phase coil current waveform and the third phase coil current waveform, respectively, have a sine waveform delayed by 60° in phase with respect to the first phase magnetic flux variation rate 44 relative to the motor-shaft direction displacement and a sine waveform delayed 120° in phase with respect to the aforementioned phase. In the period Tc, the first phase coil current waveform and the second phase coil current waveform, respectively, have a sine wave advanced by 60° in phase with respect to the first phase magnetic flux variation rate 44 relative to the motor-shaft direction displacement and a sine waveform of the same phase as the first phase magnetic flux variation rate 44 relative to the motor-shaft direction displacement. In the period Tf, the third phase coil current waveform and the first phase coil current waveform, respectively, have a sine wave delayed by 180° in phase with respect to the first phase magnetic flux variation rate 44 relative to the motor-shaft direction displacement and a sine wave delayed by 240° in phase with respect to the aforementioned rate. In the period Ta, the second phase coil current waveform and the third phase coil current waveform, respectively, have a sine wave delayed by 60° in phase with respect to the first phase magnetic flux variation rate 44 relative to the motor-shaft direction displacement and a sine waveform delayed by 120° in phase with respect to the aforementioned rate. Thereby, the synthetic shaft direction forces in the respective periods are similarly cancelled by each other.

In other expressions, when one phase is in the non-energized period, the two other phase coil current waveforms, respectively, are proportional to sine waves advanced by 60° and 120° with respect to the magnetic flux variation rate of the phase. Motor-shaft direction forces of the individual phase coil currents of the first, second, and third phases are shown by reference numerals 45, 46, and 47 in FIG. 5B. In the case of FIGS. 4A to 4C, in the periods Ta, Tb, Tc, Td, Te, and Tf, since the shaft direction forces of the two phases other than the non-energized phase are not formed vertical symmetric with respect to the time axis as the symmetry axis, there remain vibration components of the three-phase synthesized shaft direction force. On the other hand, in FIG. 5, as can be known from the fact that the shaft direction forces of the two phases other than the non-energized phase are vertical symmetric with respect to the time axis as the symmetry axis in the periods Ta, Tb, Tc, Td, Te and Tf, the vibration components of synthetic motor-shaft direction force obtained by summing the three phase motor-shaft direction forces 45, 46, and 47 are significantly reduced to substantially zero, as shown in FIG. 5C. That is, it is known that, regardless of whether or not the periods are the non-energized periods represented by Ta, Tb, Tc, Td, Te and Tf, the shaft direction forces are cancelled over the all periods, whereby significant reduction in vibration and noise can be implemented.

The following describes a method of controlling the driving currents, including the driving of the neutral point. As described above, in the voltage PWM driving, the PWM driving may be performed in the manner that the desired current waveforms capable of reducing the shaft direction forces are weighted as voltage waveforms using the means shown by the blocks 19 and 20 in FIG. 1, and the waveforms are converted into the duty ratios by being compared with the triangular waves in the comparator section 18. As described in the embodiment 2, in the current PWM driving, the example of a method of controlling the respective currents of the multiple (multiple stages of) motor driving transistors in accordance with commands is described in the Patent Document 2, for example. That is, the current driving method for three phase "Y"-connected coils without a neutral point in periods other than non-energized periods is already well known, and the same concept can be adapted also in the present case where the neutral point driving is performed in the non-energized periods. The basic concept lies in the use of current retaining forces in coils.

Referring to FIG. 5A, in the period Td, the driving transistor Tr1 shown in FIG. 2 draws out the current, and the driving transistor Tr4 draws in the current. Reference numeral 50 in FIG. 5A denotes a current that is to drive the neutral point so that the total of the currents formed of the four paths associated with the driving of the three phase coils and the neutral point driving becomes zero.

In the first half of the period Td, the driving transistor Tr4 is kept ON, and the driving transistors Tr1 and Tr7 are time-divisionally PWM driven. This state is shown in FIG. 6A. The terminal 3 of the W phase coil (W phase terminal) is in the non-energized phase, so that the current does not flow. In the divided period wherein the current is drawn in only from the U phase terminal 1 to the V phase terminal 2 to excite the U phase coil and the V phase coil, the current travels through the terminal 2, and only current Iu appears in the current detecting shunt resistor 12. In this event, current Ic does not flow through the current detecting shunt resistor 12, but is regenerated and returned to the CN terminal through the Tr4 and further through the Tr8 or through the regeneration diode parallel connected thereto.

Accordingly, when the current value has reached a current command value from the torque command signal generator section 99 for the current Iu, the high-potential-side driving transistor Tr1 for the U phase terminal 1 is set to PWM OFF in accordance with the operation of the comparator section 94. In the divided period where the current is drawn in only from the neutral point 4 to the terminal 2 (V phase) to excite the V phase coil, the current travels through the terminal 2, and only the current Ic appears in the current detecting shunt resistor 12. Accordingly, when the current value has reached a current command value from the torque command signal generator section 99 for the current Ic, the high-potential-side driving transistor Tr7 for the neutral point 4 is set to PWM OFF in accordance with the operation of the comparator section 94. In this event, the current Iu does not flow through the current detecting shunt resistor 12, but is regenerated and returned to the terminal 1 through the Tr4 and further through the Tr2 or through the regeneration diode parallel connected thereto. In the divided period where the currents are drawn in from the both terminal 1 and neutral point 4 to the terminal 2 to excite the U phase coil through the Tr1 and the V phase coil through the Tr7, the currents travel through the terminal 2, and the total currents of Iu and Ic appears in the current detecting shunt resistor 12.

Accordingly, when the current values have reached a current command value from the torque command signal generator section 99 for the total value of the currents Iu and Ic, the high-potential-side driving transistor Tr1 of the terminal 1 or the high-potential-side driving transistor Tr7 of the neutral point 4 is set to PWM OFF in accordance with the operation of the comparator section 94. As described above, in the first half of the period Td, the second-phase coil current is formed as a current having the same magnitude as the total of the first phase coil current 41 and the neutral point current 50 and having the opposite sign, and is controlled to a shape as the waveform 42 in the first half of the period Td.

In the second half of the period Td, the driving transistor Tr1 is kept ON, and the driving transistors Tr4 and Tr8 are time-divisionally PWM driven. This state is shown in FIG. 6B. The W phase terminal 3 is in the non-energized phase, so that the current does not flow. In the divided period where the current from the terminal 1 (U phase) is drawn out through the Tr4 only from the V phase terminal 2 to excite the U phase coil and the V phase coil, the current travels through the terminal 2 (V phase), and only the current Iv appears in the current detecting shunt resistor 12. Accordingly, when the current value has reached a current command value from the torque command signal generator section 99 for the current Iv, the low-potential-side driving transistor Tr4 of the terminal 2 (V phase) is set to PWM OFF in accordance with the operation of the comparator section 94. In this event, the current Ic does not flow through the current detecting shunt resistor 12, but is regenerated and returned to the terminal 1 (U phase) through Tr7 or through the regeneration diode parallel connected thereto and further through the Tr1. In the divided period where the current from the terminal 1 (U phase) is drawn out through the Tr8 only from the neutral point 4 to excite the U phase coil, the current travels through the terminal 4, and only the current Ic appears in the current detecting shunt resistor 12. Accordingly, when the current value has reached a current command value from the torque command signal generator section 99 for the current Ic, the low-potential-side driving transistor Tr8 of the terminal 4 is set to PWM OFF in accordance with the operation of the comparator section 94. In this event, the current Iv does not flow through the current detecting shunt resistor 12, but is returned to the terminal 1 (U phase) through the Tr3 or through the regeneration diode parallel connected thereto and further through the Tr1.

In the divided period where the currents are drawn out from both the terminal 2 (V phase) and the neutral point 4 through the Tr4 and the Tr8, the currents travel through the terminal 2 (V phase) and the neutral point 4, and the total of the currents Iu and Ic appears in the current detecting shunt resistor 12. Accordingly, when the current values have reached a current command value from the an input signal generator for each phase 99 for the total value of the currents Iv and Ic, the low-potential-side driving transistor Tr4 of the terminal 2 (V phase) or the low-potential-side driving transistor Tr8 of the neutral point 4 is set to PWM OFF in accordance with the operation of the comparator section 94. As described above, in the second half of the period Td, the first-phase coil current is formed as a current having the same magnitude as the total of the second-phase coil current 42 and the neutral point current 50 and has the opposite sign, and is controlled to have a shape as the waveform 41.

Similarly, in the first half of the period Tb, the driving transistor Tr1 is kept ON, and the driving transistors Tr6 and Tr8 are time-divisionally PWM driven. Thereby, the first phase coil current is formed as a current having the same magnitude as the total of the third-phase coil current 43 and the neutral point current 50 and having the opposite sign, and is controlled to have a shape as the coil current 41. In the second half of the period Tb, the driving transistor Tr6 is kept ON, and the driving transistors Tr1 and Tr7 are time-divisionally PWM driven. Thereby, the third phase coil current is controlled as a current having the same magnitude as the total of the first phase coil current 41 and the neutral point current 50 and having the opposite sign and is controlled to have a shape as the coil current 43.

Similarly, in the first half of the period Te, the driving transistor Tr6 is kept ON, and the driving transistors Tr3 and Tr7 are time-divisionally PWM driven. Thereby, the third phase coil current is formed as a current having the same magnitude as the total of the second phase coil current 42 and the neutral point current 50 and having the opposite sign, and is controlled to have a shape as the waveform 43. In the second half of the period Te, the driving transistor Tr3 is kept ON, and the driving transistors Tr6 and Tr8 are time-divisionally PWM driven. Thereby, the second phase coil current is formed as a current having the same magnitude as the total of the third-phase coil current 43 and the neutral point current 50 and having the opposite sign, and is controlled to have a shape as the waveform 42.

Similarly, in the first half of the period Tc, the driving transistor Tr3 is kept ON, and the driving transistors Tr2 and Tr8 are time-divisionally PWM driven. Thereby, the second phase coil current is formed as a current having the same magnitude as the total of the first phase coil current 41 and the neutral point current 50 and having the opposite sign, and is controlled to have a shape as the waveform 42. In the second half of the period Tc, the driving transistor Tr2 is kept ON, and the driving transistors Tr3 and Tr7 are time-divisionally PWM driven. Thereby, the first phase coil current is formed as a current having the same magnitude as the total of the second-phase coil current 42 and the neutral point current 50 and having the opposite sign, and is controlled to have a shape as the coil current 41.

Similarly, in the first half of the period Tf, the driving transistor Tr2 is kept ON, and the driving transistors Tr5 and Tr7 are time-divisionally PWM driven. Thereby, the first phase coil current is formed as a current having the same magnitude as the total of the third-phase coil current 43 and the neutral point current 50 and having the opposite sign, and is controlled to have a shape as the coil current 41. In the second half of the period Tf, the driving transistor Tr5 is kept ON, and the driving transistors Tr2 and Tr8 are time-divisionally PWM driven. Thereby, the third phase coil current is formed as a current having the same magnitude as the total of the first phase coil current 41 and the neutral point current 50 and having the opposite sign, and is controlled to have a shape as the coil current 43.

Similarly, in the first half of the period Ta, the driving transistor Tr5 is kept ON, and the driving transistors Tr4 and Tr8 are time-divisionally PWM driven. Thereby, the third phase coil current is formed as a current having the same magnitude as the total of the second-phase coil current 42 and the neutral point current 50 and having the opposite sign, and is controlled to have a shape as the coil current 43. In the second half of the period Ta, the driving transistor Tr4 is kept ON, and the driving transistors Tr5 and Tr7 are time-divisionally PWM driven. Thereby, the second phase coil current is formed as a current having the same magnitude as the total of the third-phase coil current 43 and the neutral point current 50 and having the opposite sign, and is controlled to have a shape as the coil current 42.

Regarding the PWM driving described above, in the event that one of the driving transistor constituting each half bridge circuit of the half bridge circuit group is pulse width modulated, the other driving transistor constituting the identical half bridge circuit may be OFF or may be of a synchronous rectification type where the ON state is PWM operated with opposite polarities after an appropriate dead time has been secured so as not to cause a shoot-through current. According to the contents described in the Patent Document 2 regarding the time division driving, three phase coil current waveforms can be controlled to have desired shapes through all times, and hence the shaft direction forces can be sufficiently reduced, thereby enabling the vibration and the noise to be sufficiently suppressed at a low cost.

As described in conjunction with the current control in the first and second halves of the period Td, the case occurs in which the coil current driving transistor for the phase neither being kept ON nor being the non-energized phase and the neutral point driving transistor simultaneously both stay in the ON state. This case occurs in the event that, within a time when only one of the driving transistors turns ON, the other transistor starts assuming the ON-timing before the current of the former transistor reaches the target value. In this case, control is performed applying the method described in the Patent Document 2 in such a manner that either one of the driving transistors is turned OFF when the magnitude of the total current of the both becomes equal to the coil current of the phase being kept ON.

EMBODIMENT 5

Figure 7A:
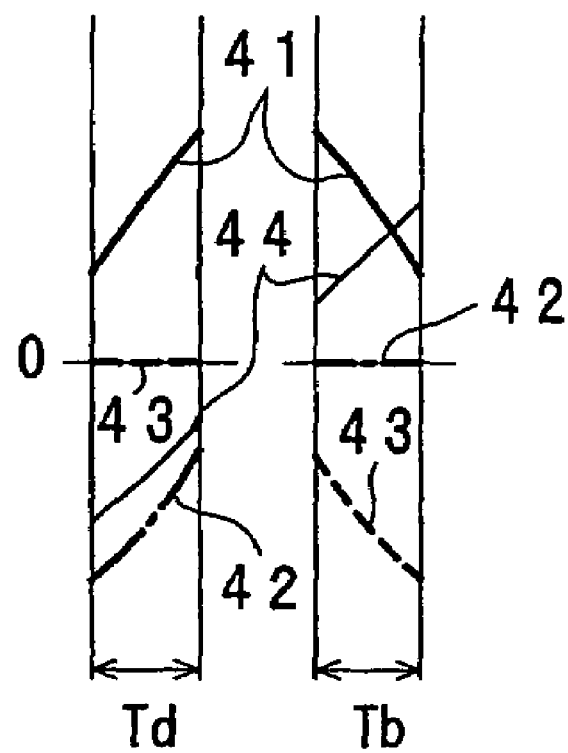
FIGS. 7A and 7B are views descriptive of coil current waveforms, shaft direction magnetic flux variation curves, and shaft direction forces in the non-energized period in the embodiment 4 of the invention.
Figure 7B:
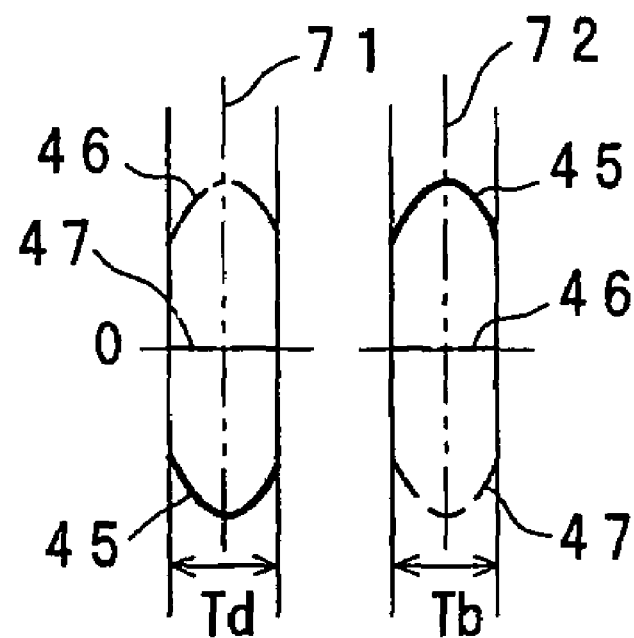

With reference to the description made by using FIG. 5, by way of extracting the periods having the energized phases, FIG. 7A shows the three phase coil current waveforms 41, 42, and 43 and the first phase magnetic flux variation rate 44 relative to the motor-shaft direction displacement, and FIG. 7B shows the three phase shaft direction forces 45, 46, and 47. In the present case, the first and second shaft direction forces 45 and 46 in the period Td not only mutually form a symmetric shape with respect to not only the zero axis, that is, the time axis, but also individually form a symmetric shape with respect to a symmetry axis 71 of an intermediate time point of the period Td.

Similarly, the third and first phase shaft direction forces 47 and 45 are symmetric with respect to both the time axis and a symmetry axis 72. In FIGS. 7A and 7B, in a period where a certain phase is non-energized, the current waveforms of the other phases take a waveform that is a part of the sine wave. However, in actual practice, the current waveform does not have to be necessarily formed of a part of the sine wave. Also the symmetry with respect to the symmetry axis set to the intermediate time point of the respective non-energized period of the respective phase shaft direction force is not an absolutely necessary condition, but any of other conditions satisfying the symmetry with respect to the zero axis, that is, time axis is sufficient to suppress the synthetic shaft direction force.

Figure 8A:
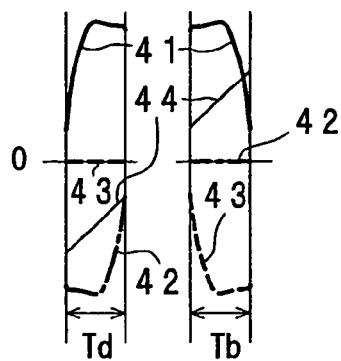
FIGS. 8A, 8B, 8C, 8D and 8E are views descriptive of coil current waveforms, shaft direction magnetic flux variation curves, and shaft direction forces in the non-energized period in the embodiment 5 of the invention.
Figure 8B:
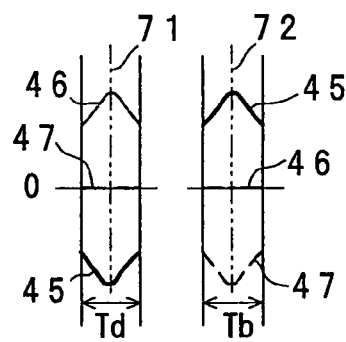
Figure 8C:
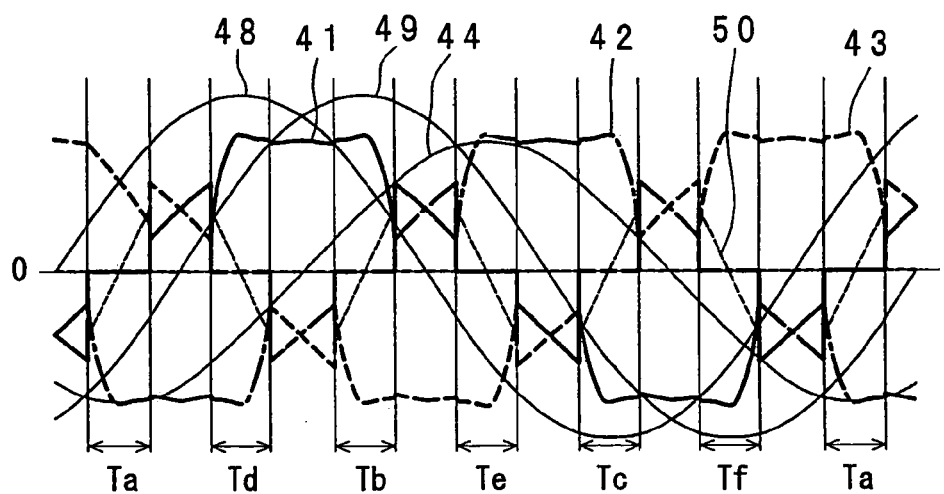
Figure 8D:
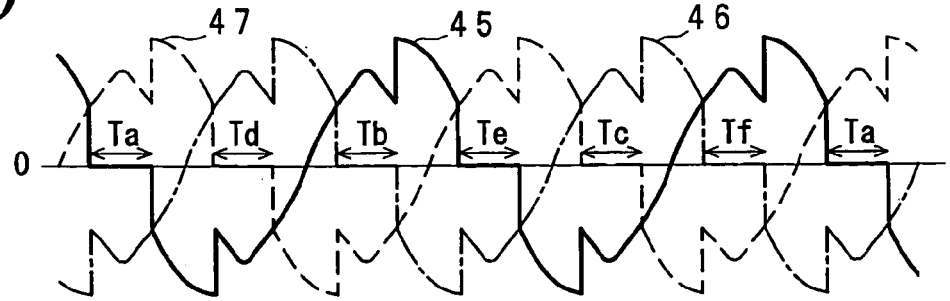
Figure 8E:
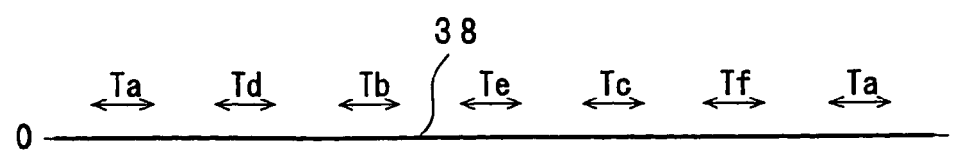

FIG. 8C shows three phase coil current waveforms 41, 42, and 43 in a case where the coil current waveform of the respective energized phase is not a part of the sine wave when one phase is in the non-energized period; the first phase magnetic flux variation rate 44 relative to the motor-shaft direction displacement, the sine waves 49 and 48 advanced, respectively, by 60° and 120° in phase from the phase of the sine wave of the magnetic flux variation rate 44; and a neutral point current 50. FIGS. 8D and 8E, respectively, show motor-shaft direction forces 45, 46, and 47 for the respective first, second, and third phases shown in FIG. 8C, and the vibration component 38 of a synthetic motor-shaft direction force obtained by summing the three phase motor-shaft direction forces 45, 46, and 47.

More particularly, by way of extracting portions related to the periods Td and Tb of FIGS. 8C and 8D, FIG. 8A shows three phase coil current waveforms 41, 42, and 43 that individually are not parts of the sine waves and the first phase magnetic flux variation rate 44 relative to the motor-shaft direction displacement, and FIG. 8B shows the three phase shaft direction forces 45, 46, and 47. It can easily be known from FIG. 8C that in the periods Td and Tb, the first phase coil current is not proportional to the respective sine waves 48 and 49. In this case, in the period where the coil of one phase is in the non-energized state, the respective motor-shaft direction forces of the remaining two phases are axially symmetric with respect to, for example, axes 71 and 72 of intermediate time points. As a result, in the period Td, the shaft direction force 45 generated with the first phase coil current and the shaft direction force 46 generated with the second-phase coil current are axially symmetric with respect to a "shaft direction force=zero" axis, that is, the time axis. In the period Tb, the shaft direction force 47 generated with the third-phase coil current and the shaft direction force 45 generated with the first phase coil current are axially symmetric with respect to a "shaft direction force=zero" axis, that is, the time axis.

In this case also, as shown in FIG. 8E, it is indicated that the vibration component 38 of the synthetic shaft direction forces is reduced to be very small, so that the motor vibration and the noise can be sufficiently reduced. Similarly, according to the contents of the Patent Document 2 regarding the time division driving already described, the three phase coil current waveforms can be controlled into desired shapes over the all times, and hence the shaft direction forces can be sufficiently reduced, thereby enabling the vibration and the noise to be sufficiently suppressed at low costs.

EMBODIMENT 6

Figure 9A:
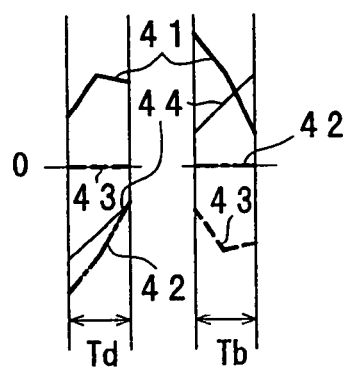
FIGS. 9A, 9B, 9C, 9D and 9E are views descriptive of coil current waveforms, shaft direction magnetic flux variation curves, and shaft direction forces in the non-energized period in the embodiment 6 of the invention.
Figure 9B:
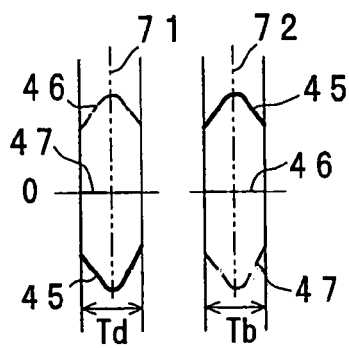
Figure 9C:
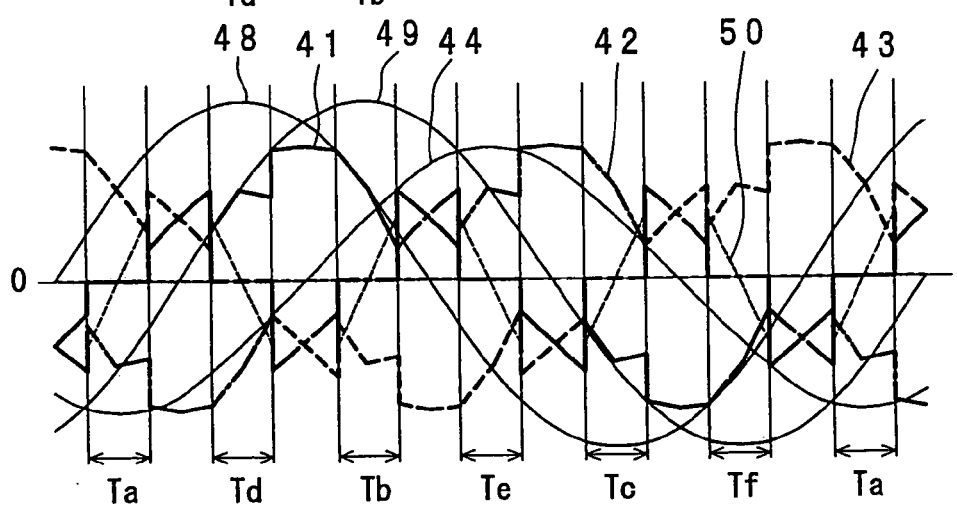

FIG. 9C shows three phase coil current waveforms 41, 42, and 43 in the case where, each of the shaft direction forces of the other two phases than the non-energized phase does not have symmetry with respect to the axis of the intermediate time point in each of the non-energized periods, a sine wave of a first phase magnetic flux variation rate 44 relative to the motor-shaft direction displacement, sine waveforms 49 and 48 advanced by 60° and 120° in phase, respectively, from the phase of the sine wave of the magnetic flux variation rate 44, and a neutral point current waveform 50.

Figure 9D:
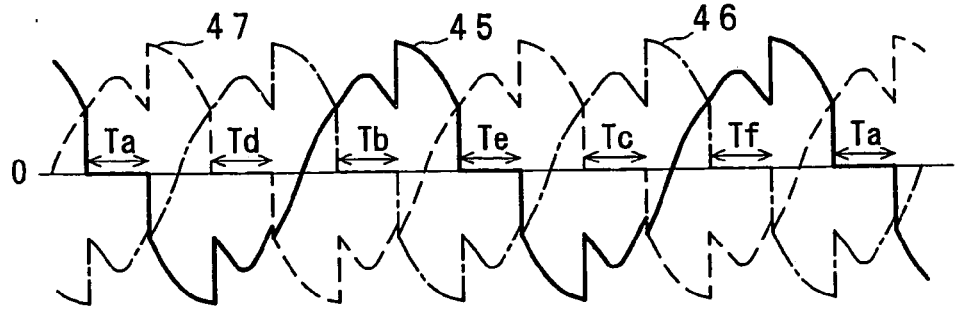
Figure 9E:
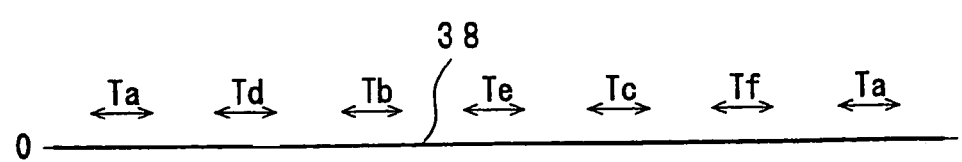

FIGS. 9D and 9E, respectively, show motor-shaft direction forces 45, 46, and 47 of the respective first, second, and third phases shown in FIG. 9C, and a vibration component 38 of a synthetic motor-shaft direction force obtained by summing the three phase motor-shaft direction forces 45, 46, and 47. More particularly, FIGS. 9A and 9B are formed by way of extracting the periods Td and Tb shown in FIGS. 9C and 9D. FIG. 9A shows parts of the three phase coil current waveforms 41, 42, and 43 which are not parts of the sine waves, and a part of the first phase magnetic flux variation rate 44 relative to the motor-shaft direction displacement. FIG. 9B shows parts of the three phase shaft direction forces 45, 46, and 47 that do not have symmetry with respect to, for example, axes 71 and 72 of the intermediate time points of the non-energized periods. Referring to the case of the first phase, the time symmetry in the current waveform is not produced as can be known from the fact that there is no axial symmetry between the coil current in the period Td and the coil current in the period Tb, and there is no axial symmetry between the coil current in the period Tc and the coil current in the period Tf. However, the respective phase current waveforms have relationships in phase shifted by 120° to one another, whereby the shaft direction forces thereof in the corresponding non-energized phase are satisfied for the symmetry with respect to the zero axis, that is, the time axis.

As described above, the motor driving method is the sensorless three-phase motor driving method, wherein the respective phase coil current waveforms are characterized such that, in the non-energized period (Ta, Te) of the first phase coil current, the function (46) has substantially the same magnitude having the opposite polarity with respect to the function (47). In this context, the function (46) is the product of the multiplication of the second-phase coil current (42) delayed in phase by an electrical angle of 120° from the first phase (41) and the sine wave delayed in phase by an electrical angle of 90° from the second-phase coil current, and the function (47) is the product of the multiplication of the third-phase coil current (43) advanced in phase by an electrical angle of 120° from the first phase and the sine wave delayed in phase by an electrical angle of 90° from the third-phase coil current.

Also in this case, it is indicated that the synthetic shaft direction forces are reduced to be very low, and hence the motor vibration and the noise can be sufficiently reduced. It can be said that when the fundamental wave of the coil current of the phase advanced by 120° of the other two phase coil currents to be energized in the non-energized period is represented by $\sin(\theta)$, the current waveform of the phase may be a function $f(\theta)$ that satisfies an equation (1) as below:

$$f(\theta)\cdot\cos(\theta)+f(\theta-120)\cdot\cos(\theta-120)=0 \quad (1)$$

The above indicates that, in the period Td, the shaft direction force with respect to the first phase coil current corresponds to the first left part term of the equation (1), the shaft direction force with respect to the second phase coil current delayed by 120° in phase from the first phase corresponds to the second left side item of the equation (1), and the total of the two items is zero. It can easily be known that also the contents described in the embodiment 4 satisfy the equation (1).

In the embodiment shown in FIG. 8C, in the period Td, although the first phase current waveform and the second phase current waveform are point symmetric with respect to the intermediate time point of the period Td on the time axis, the point symmetry is not necessarily needed. More specifically, although FIG. 9C does not have point symmetry as FIG. 8C, the first phase current waveform in the period Td is identical to the second phase current waveform in the period Te and identical to the third phase current waveform in the period Tf, and is further identical to a waveform obtained by multiplying the first phase coil current in the period Tc by −1, to a waveform obtained by multiplying the second phase coil current in the period Ta by −1, and to a waveform obtained by multiplying the third phase coil current in the period Tb by −1. The second phase current waveform in the period Td is identical to the third phase current waveform in the period Te and identical to the first phase current waveform in the period Tf, and is further identical to a waveform obtained by multiplying the second phase coil current in the period Tc by −1, to a waveform obtained by multiplying the third phase coil current in the period Ta by −1, and to a waveform obtained by multiplying the first phase coil current in the period Tb by −1.

Referring to the equation (1), in the period where one phase is in the non-energized period, the shaft direction force by the current advanced by 120° of the remaining phases is proportional to the first part of the equation, and the shaft direction force by the other current is proportional to the second part of the equation. The current formation as described above can be made by forming the respective phase coil currents of the above-described motor coils independent of one another. Also, in this case, it is indicated that the synthetic motor-shaft direction force is reduced to be very small, and as shown by the vibration component 38 of the synthetic motor-shaft direction force in FIG. 9E, the motor vibration and the noise can be sufficiently reduced.

Similarly, according to the contents of the Patent Document 2 regarding the time division driving already described, the three phase coil current waveforms can be controlled into the desired shapes over the all times, and the shaft direction forces can be sufficiently reduced, thereby enabling the vibration and noise to be sufficiently suppressed at a low cost.

Whereas the equation (1) relates to the three-phase motor, extension thereof for an N-phase multiphase motor results in Equation (2) as below:

$$\Sigma f(\theta - (k-1) \cdot 360/N) \cdot \cos(\theta - (k-1) \cdot 360/N) = 0 \quad (2)$$

It is now assumed that the equation (2) be applied in the period where one phase is in the non-energized state. In this case, $\Sigma$ is the sum from $k=1$ to $k=N-1$. However, when extending consideration to the periods where the all coil currents are in the non-energized state, it may be considered that $\Sigma$ represents the sum from $k=1$ to $k=N$. In addition, even when one phase is in an non-energized period, since the term of $k=N$ is zero, the equation (2) is still satisfied even when $\Sigma$ is assumed to be the sum from $k=1$ to $k=N$.

EMBODIMENT 7

Figure 10A:
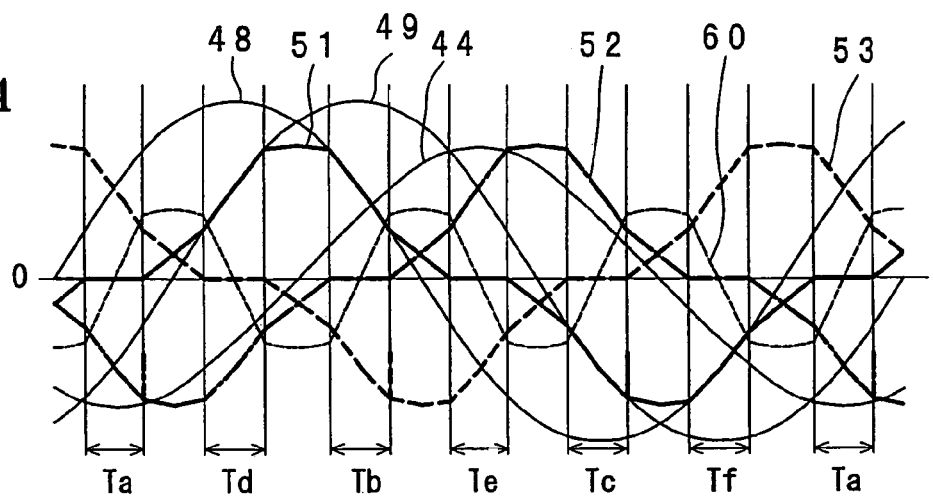
FIGS. 10A, 10B and 10C are views descriptive of a motor driving method relative to the coil current in an embodiment 7 of the invention.
Figure 10B:
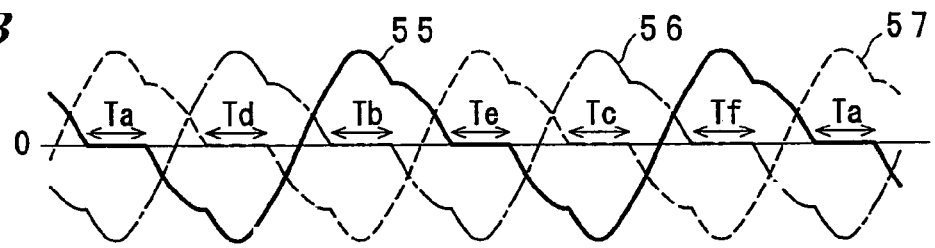

As described above, whereas FIGS. 5A and 5B show the case where the respective phase coil current waveforms have the noncontinuous points, FIGS. 10A and 10B show waveforms of magnetic flux variation rates relative to the motor-shaft direction displacements and three phase shaft direction forces in the case where the currents have no noncontinuous points. Reference numeral 51 denotes a first phase coil current waveform, reference numeral 52 denotes a second phase coil current waveform, reference numeral 53 denotes a third phase coil current waveform, and reference numeral 44 denotes a first phase magnetic flux variation rate relative to a corresponding motor-shaft direction displacement.

Figure 10C:
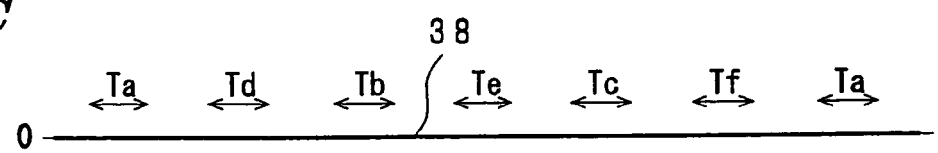
Figure 11:
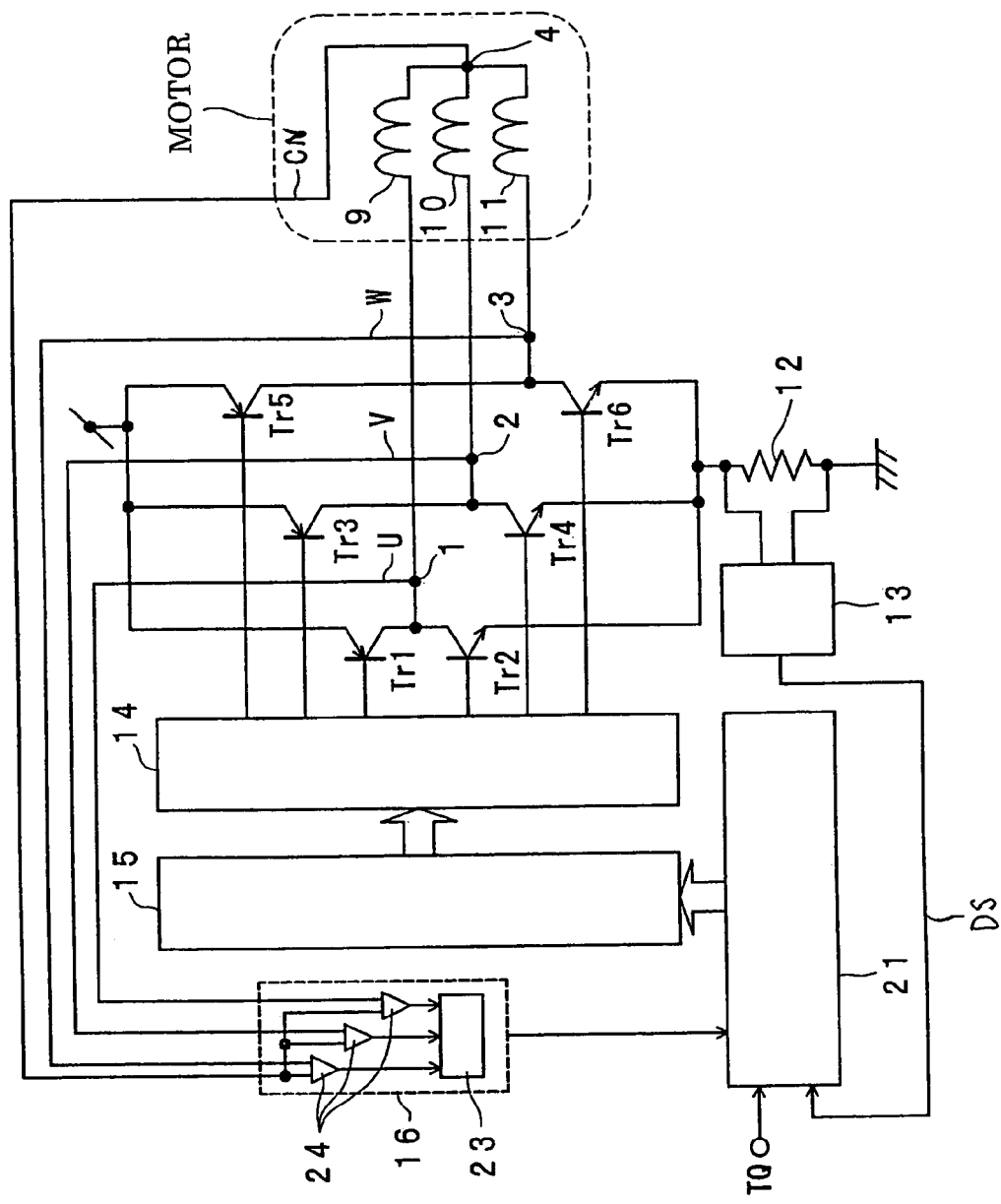
FIG. 11 is a circuit diagram showing a conventional motor driving apparatus of a sensorless type.
Figure 12:
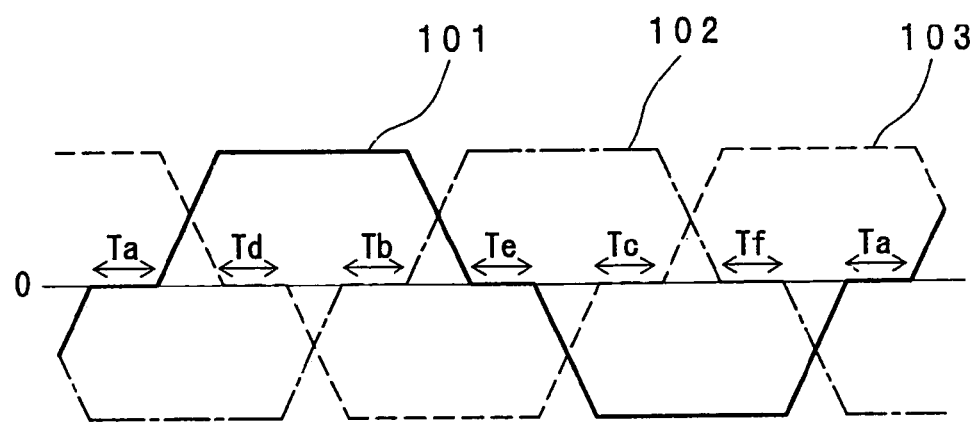
FIG. 12 is a view showing three phase coil current waveforms in the conventional sensorless type.
Figure 13A:
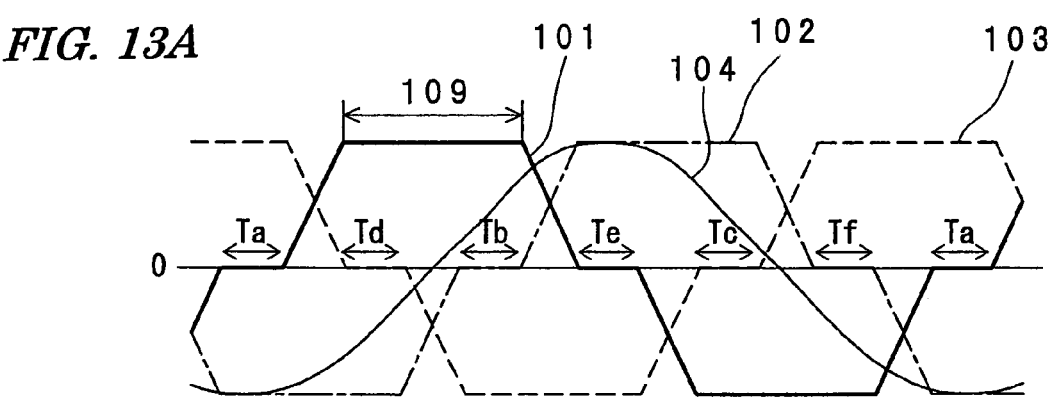
FIGS. 13A, 13B and 13C are views showing coil current waveforms, shaft direction magnetic flux variation curves, and shaft direction forces, respectively, in the conventional sensorless type.
Figure 13B:
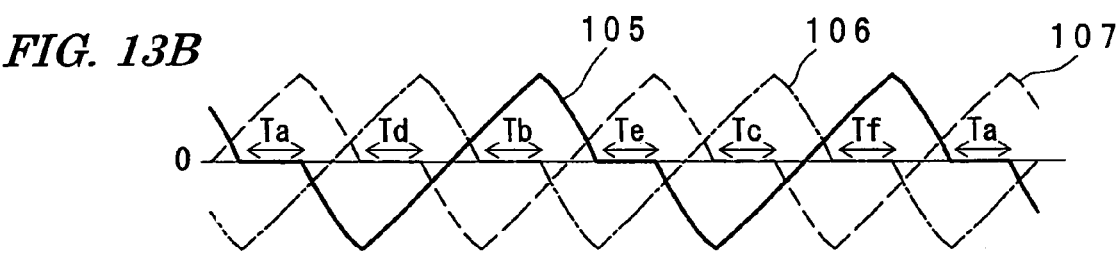
Figure 13C:
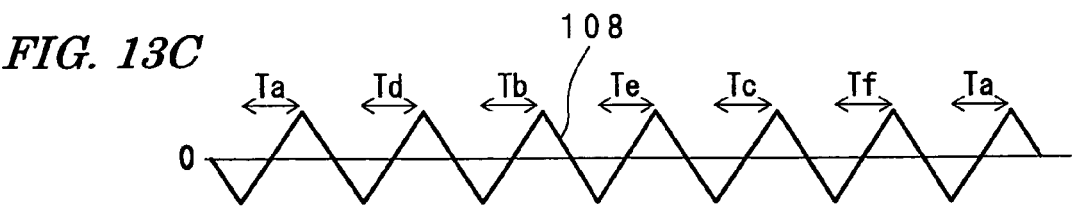

In FIG. 10A, reference numerals 48 and 49, respectively, denote sine waves advanced by 120° and 60° in phase respectively from the phase of the sine wave of the first phase magnetic flux variation rate relative to the motor-shaft direction displacement, and reference numeral 60 denotes a neutral point current. In FIG. 10B, reference numerals 55, 56, and 57 denote motor-shaft direction forces with respect to the first phase, second phase, and third phase coil currents 51, 52, and 53, respectively. In FIG. 10C, reference numeral 38 denotes a vibration component of the synthetic motor-shaft direction force.

In a period between the non-energized periods Ta and Td, the first phase coil current waveform 51 is set to substantially zero at a boundary with the period Ta, and is set so that the current becomes continuous also at a boundary with the period Td. Likewise, the third phase coil current waveform 53 is set to substantially zero at a boundary with the period Td, and is set so that the current becomes continuous also at a boundary with the period Ta. Each of these current waveforms has approximately a triangular shape.

Similar treatments are applied to the other coil currents, thereby to cause the respective phase coil currents to be continuous over all the periods. That is, the treatments are applied to the third and second phase coil currents 53 and 52 in a period between the periods Td and Tb, applied to the second and first phase coil currents 52 and 51 in a period between the periods Tb and Te, applied to the first and third phase coil current 51 and 53 in a period between the periods Te and Tc, applied to the third and second phase coil currents 53 and 52 in a period between the periods Tc and Tf, and applied to the second and first phase coil currents 52 and 51 in a period between the periods Tf and Ta. Under these conditions, the three phase shaft direction forces become continuous as shown in FIG. 10B, and the synthetic shaft direction force can be reduced as shown in FIG. 10C. That is, as in the present embodiment, also the synthetic shaft direction force can be reduced while current continuity is secured.

Similarly, according to the contents of the Patent Document 2 regarding the time division driving already described, the three phase coil current waveforms can be controlled into the desired shapes over the all times, and the shaft direction forces can be sufficiently reduced, thereby enabling the vibration and the noise to be sufficiently suppressed at a low cost.

In other words, as the phase current waveforms are observed in every period shown in FIG. 10A, the respective phase continuous waveforms have one cycle including an non-energized period, a subsequent slow-sloped current increase period, a subsequent sharp-sloped current increase period, a subsequent maximum current period, a subsequent sharp-sloped current decrease period, a subsequent slow-sloped current decrease period, a subsequent non-energized period, a subsequent slow-sloped current decrease period, a subsequent sharp-sloped current decrease period, a subsequent minimum current period, a subsequent sharp-sloped current increase period, a subsequent slow-sloped current increase period, and a subsequent non-energized period. With formation of such current waveforms as above, the shaft direction forces can be reduced to thereby enable vibration reduction and noise reduction.

EMBODIMENT 8

Regarding each of the phases, the torque constant waveform of the phase and the shaft direction force waveform are different by 90° in phase. In the description hereinabove, the discussion has been made regarding the case under the condition of producing a maximum efficiency where the respective phase coil current and the torque constant waveform are matched with one another, and the coil current of the phase and the shaft direction force waveform are different by 90° in phase. Suppose that, with the respective phase coil currents having the waveforms as determined in the embodiments 4 to 7 described above, driving occurs in phase relations where there are phase differences between the coil currents of the phases as in the states of holding the determined waveforms, i.e., the respective coil currents of the phases and the shaft direction forces waveform are offset from the 90° phase difference. In this case, it is known that while offset levels of the synthetic shaft direction forces are shifted, the amplitudes thereof are restrained, similarly as in the cases discussed above.

Accordingly, the effects of the noise reduction and the vibration reduction can be produced by driving per se with the respective phase coil currents having the waveforms as determined in the embodiments 4 to 7 described above. Especially, when the phases are advanced, enhancements can be implemented for, for example, the maximum rotation speed and acceleration. However, normally, in terms of efficiency, it is preferable that the driving be performed with the phase differences being maintained by a constant angle, particularly, by 90°.

Description has thus been made referring to the case of the PWM driving. However, when performing linear driving instead of the PWM driving, it is sufficient to provide means for supplying the coils with linear voltages such that predetermined currents are supplied, and when both the three phase coil terminals and the neutral point are linearly driven, the motor driving similar to the PWM driving can be performed with sufficiently reduced the vibration and the noise. In this case, it is sufficient to remove the blocks 17 and 18 in FIG. 1 and to thereby provide three phase voltage waveforms and a neutral point voltage waveform in the form of linear outputs of voltage to the output circuits. In the configurations shown in FIGS. 2 and 3, it is sufficient to supply the torque command signal generator section 99 with error amplification outputs of errors between the current detection values DS and the original input torque command signals TQ and to remove the blocks 94, 97, and 98, thereby to perform linear output the three phase coil current waveforms and the neutral-point flow-out/in current waveform to the output circuit currents. Also such a case of applying the linear driving is included within the scope of the present invention.

A part of the coil terminals including the neutral point may be driven by the linear driving, and the remaining terminals may be driven by the PWM driving. Also in this case, desired current waveforms can be formed as the respective current waveforms, thereby enabling the vibration and the noise to be reduced. For example, only the neutral point may be driven by the linear driving and the three coil terminals on the opposite side of the neutral point may be driven by the PWM driving.

The non-energized periods are rendered with an electric angle of about 30° in the respective timing diagrams of FIGS. 5A to 5C, 7A to 7B, 8A to 8E, 9A to 9E, and 10A to 10C. However, each of the non-energized periods are not limited to the electric angle of 30°, but various other electric angles can be rather adapted to the non-energized periods in the present invention. With reduction of the non-energized periods, the flow-out/in current of the neutral point can be further reduced, and only a drive capability further lower than the other coil driving transistors is needed for the neutral point driving transistor, thereby to improve the efficiency as well.

In addition, although description has thus been provided referring to the three phase coil motor as the examples, motor driving with sufficient reduction of the vibration and the noise can be performed using the same concept even in the case of driving a motor having further increased multiple phases in such a manner as below. That is, in the period being set to allow the presence of a phase having nonenergized states for detecting the zero crossing time of the back electromotive voltage, the above-described energized currents are adjusted and controlled to cause the vibration component of the synthetic shaft direction forces generated by energized currents of the other phases to come into close proximity of zero. Thus, the invention can also be adapted to multiphase motors having more phases than those of the three-phase motor.

Further, for example, the types of devices constituting the driving transistors and the types of the polarities for the circuit configurations may be those other than those described above. Further, for the zero-crossing detection of the back electromotive voltages, every-time zero crossings of the back electromotive voltages for the three phase coils are not necessarily used, but, for example, the zero-crossing detection may be used for detecting back electromotive voltages of only specific phases or the zero-crossing detection may be used by reducing the detection frequency. Also for the coil current waveforms, desired effects can be produced with coil current waveforms in as much as outlines thereof satisfies the requirements and conditions of the invention. The described examples may be modified in various ways without departing the scope and the spirit of the invention, and any modified configuration example is included in the present invention.

As industrial applicability, the motor driving apparatus and method are based on the sensorless driving, and the motors with functionalities for sufficient vibration and the noise reduction can be realized at low costs, and the ranges of usability and the applicability of the invention are very wide.

What is claimed is:

1. A motor driving apparatus for driving a multiphase motor by controlling energization to star-connected motor driving coils of multiple phases, the apparatus comprising:
   a rotor position detector section for obtaining rotor position information by detecting back electromotive voltages induced in a motor driving coil of a non-energized phase;
   a half bridge circuit group including a pair of high-potential-side driving transistors and low-potential-side driving transistors respectively connected to one side of terminals of the motor driving coils and the other side of the terminals which is a neutral point of the motor driving coils;
   a torque command signal generator section for generating torque command signals for motor driving in accordance with original torque command signals input from the outside and output signals of the rotor position detector section;
   a pulse modulation control signal generator section for generating pulse modulation control signals for driving each phase coil in accordance with the command signals generated by the torque command signal generator section; and
   an energization control section which is supplied with the pulse modulation control signals and controls the energization of the motor driving coils of the multiple phases at a predetermined cycle in accordance with the supplied pulse modulation control signals,
   wherein the energization control section sets an non-energized period during which only one motor driving coil of the motor driving coils of the multiple phases is set to an non-energized state and the energization control section performs the energization to the neutral point in the non-energized period, so that the motor driving is performed in a manner such that a total of coil currents of the multiple phases is not zero in the non-energized period.

2. The motor driving apparatus according to claim 1, wherein the energization control section sets the neutral point terminal to be in a non-energized state where the neutral point terminal is not energized in an all-coil energized period during which driving currents are flowed to all the motor driving coils.

3. The motor driving apparatus according to claim 1, further comprising a total current detecting section for detecting either a total current of all the high-potential-side driving transistors or a total current of all the low-potential-side driving transistors, and the energization of each of the motor driving coils is time-divisionally controlled.

4. The motor driving apparatus according to claim 1, further comprising:
- a shunt resistor for detecting either a total current of the high-potential-side driving transistors or a total current of the low-potential-side driving transistors; and
- an error amplifier section that amplifies a difference between a signal in accordance with an inter-terminal potential difference of the shunt resistor and a signal in accordance with the torque command value,
- wherein the torque command signal generator section generates the torque command signal of the individual phase in accordance with an output signal of the error amplifier section and the output signal of the rotor position detector section.

5. The motor driving apparatus according to claim 1, further comprising:
- a PWM ON pulse generator section that generates a pulse signal for selecting the high-potential-side and the low-potential-side driving transistors and for starting PWM energization;
- a shunt resistor for detecting either a total current of the high-potential-side driving transistors or a total current of the low-potential-side driving transistors; and
- a comparator that performs comparison between a signal of an inter-terminal potential difference across the shunt-resistor and the torque command signals for the individual phases including the neutral point together with a torque command signal equivalent to the sum of the torque command signals, the torque command signals being generated from the torque command signal generator section,
- wherein the pulse modulation control signal generator section generates PWM signals in accordance with output signals of the PWM ON pulse generator section and output signals of the comparator.

6. The motor driving apparatus according to claim 2, further comprising a total current detecting section for detecting either a total current of all the high-potential-side driving transistors or a total current of all the low-potential-side driving transistors, and the energization of each of the motor driving coils is time-divisionally controlled.

7. The motor driving apparatus according to claim 2, further comprising:
- a shunt resistor for detecting either a total current of the high-potential-side driving transistors or a total current of the low-potential-side driving transistors; and
- an error amplifier section that amplifies a difference between a signal in accordance with an inter-terminal potential difference of the shunt resistor and a signal in accordance with the torque command value,
- wherein the torque command signal generator section generates the torque command signal of the individual phase in accordance with an output signal of the error amplifier section and the output signal of the rotor position detector section.

8. The motor driving apparatus according to claim 2, further comprising:
- a PWM ON pulse generator section that generates a pulse signal for selecting the high-potential-side and the low-potential-side driving transistors and for starting PWM energization;
- a shunt resistor for detecting either a total current of the high-potential-side driving transistors or a total current of the low-potential-side driving transistors; and
- a comparator that performs comparison between a signal of an inter-terminal potential difference across the shunt-resistor and the torque command signals for the individual phases including the neutral point together with a torque command signal equivalent to the sum of the torque command signals, the torque command signals being generated from the torque command signal generator section,
- wherein the pulse modulation control signal generator section generates PWM signals in accordance with output signals of the PWM ON pulse generator section and output signals of the comparator.

9. A motor driving method for driving a multiphase motor by controlling energization of star-connected motor driving coils of multiple phases and by performing driving control of a pair of high-potential-side driving transistors and low-potential-side driving transistors respectively connected to one side of terminals of the motor driving coils and the other side of the terminals which is a neutral point of the motor driving coils, the method comprising the steps of:
- obtaining rotor position information by detecting back electromotive voltages induced in a motor driving coil of a non-energized phase;
- generating torque command signals for motor driving in accordance with original torque command signals input from the outside and the obtained rotor position information;
- generating pulse modulation control signals for driving each phase coil in accordance with the generated torque command signals; and
- controlling the energization of the motor driving coils of the multiple phases at a predetermined cycle in accordance with the pulse modulation control signals,
- wherein, in the energization controlling step, there is set an non-energized period during which only one motor driving coil of the motor driving coils of the multiple phases is set to an non-energized state and the energization control step performs the energization to the neutral point in the non-energized period, and wherein the energization control step does not perform the energization to the neutral point in an all-coil energized period during which driving currents are flowed to all the motor driving coils, so that the motor driving is performed in a manner such that a total of coil currents of the multiple phases is not zero in the non-energized period.

10. The motor driving method according to claim 9, further comprising a step of detecting either a total current of all the high-potential-side driving transistors or a total current of all the low-potential-side driving transistors, thereby time-divisionally performing the energization control so that energized currents to the terminals of the motor driving coils respectively becomes predetermined target current values.

11. The motor driving method according to claim 9, wherein the total of the coil currents becomes zero in the all-coil energized period during which driving currents are flowed to all the motor driving coils.

12. The motor driving method according to claim 9, wherein in the non-energized period during which only one motor driving coil is set to the non-energized state, waveforms of the coil currents of the respective phases are formed such that a total sum of products of multiplication of the coil currents of the respective phases and shaft direction force constant waveforms different by 90° in phase from torque constant waveforms of the coil currents becomes substantially zero.

13. The motor driving method according to claim 9, wherein in the non-energized period during which only one motor driving coil is set to the non-energized state, the coil currents of the respective phases are controlled to have waveforms such that each of products of multiplication of the coil currents of the respective phases and respective sine functions different by 90° in phase from current phases of the coil currents of the respective phases mutually form a shape substantially axially symmetric with respect to a symmetry axis of an intermediate time point of the non-energized period.

14. The motor driving method according to claim 9, which is a driving method for a sensorless three-phase motor, wherein waveforms of the coil currents of the respective phases are formed such that a function of a product of multiplication of a second-phase coil current delayed in phase by an electrical angle of 120° from a first phase and a sine wave delayed in phase by an electrical angle of 90° from a second-phase coil current has substantially a same magnitude and an opposite polarity with respect to a function of a product of multiplication of a third-phase coil current advanced in phase by an electrical angle of 120° from the first phase and a sine wave delayed in phase by an electrical angle of 90° from a third-phase coil current, in an non-energized period of the first phase coil current.

15. The motor driving method according to claim 9, which is a driving method for a sensorless three-phase motor, wherein waveforms of the coil currents of the respective phases are formed such that, a function of a product of multiplication of a second-phase coil current delayed in phase by an electrical angle of 120° from a first phase and a sine wave delayed in phase by an electrical angle of 90° from a second-phase coil current and a function of a product of multiplication of a third-phase coil current advanced in phase by an electrical angle of 120° from the first phase and a sine wave delayed in phase by an electrical angle of 90° from a third-phase coil current, form substantially a symmetric shape with respect to an intermediate time point of the non-energized period of the first phase coil current set as a symmetry axis thereof.

16. The motor driving method to claim 9, which a driving method for a multiphase motor having the number of phases being N, wherein, assuming that k represents an integer from 1 to N, a function of the coil current of the respective phases is represented by $f(\theta-(k-1)\cdot 360/N)$, and a fundamental wave related to an overall cycle of $f(\theta)$ is represented by $\sin(\theta)$, $f(\theta)$ is a function satisfying an equation all the time as following:

$$\Sigma f(\theta-(k-1)\cdot 360/N)\cdot \cos(\theta-(k-1)\cdot 360/N)=0$$

wherein $\Sigma$ represents a sum of the products of the coil currents of the respective phases and a sine wave advanced by an electrical angle of 90° from the fundamental wave thereof with respect to all the phases in the range from k=1 to k=N.

17. The motor driving method according to claim 13, wherein, in a period during which a motor coil of one phase is in an non-energized state, coil current waveforms of the other phases that are not in the non-energized state are formed such that, when a fundamental wave component of the corresponding current waveforms is represented by $\sin(\theta)$, the current waveform of one phase, the fundamental wave component of which is represented by $\sin(\theta)$, is proportional to $\sin(\theta-30)$ in a period during which the other one phase is in the non-energized state during a transition from a zero current level to a peak of the sine wave and in a period during which the other one phase is in the non-energized state during a transition from a zero current level to a bottom of the sine wave, and the current waveform of the one phase, the fundamental wave component of which is represented by $\sin(\theta)$, is proportional to $\sin(\theta+30)$ in a period during which the other one phase is in the non-energized state during a transition from the peak of the sine wave to the zero current level and in a period during which the other one phase is in the non-energized during a transition from the bottom of the sine wave to the zero current level.

18. The motor driving method according to claim 9, wherein a coil current waveform in an energized period of a coil of a certain one phase interposed between a non-energized period of the coil of the certain one phase and a non-energized period of a coil of the other phases adjacent thereto is formed to be substantially a triangular shape wherein the current value becomes zero on the non-energized period side of the coil, whereby the coil currents of the respective phases are made to be continuous over all cycles.

19. The motor driving method according to claim 9, wherein motor driving is performed in a manner that a phase difference between the coil current waveform of the respective phases and the torque constant waveform of the respective phases is maintained to be substantially a constant angle.

20. The motor driving method according to claim 9, wherein one cycle of the continuous current waveforms of the respective phases having the non-energized periods includes an non-energized period, a subsequent slow-sloped current increase period, a subsequent sharp-sloped current increase period, a subsequent maximum current period, a subsequent sharp-sloped current decrease period, a subsequent slow-sloped current decrease period, a subsequent non-energized period, a subsequent slow-sloped current decrease period, a subsequent sharp-sloped current decrease period, a subsequent minimum current period, a subsequent sharp-sloped current increase period, a subsequent slow-sloped current increase period, and a subsequent non-energized period.

21. The motor driving method according to claim 10, wherein the total of the coil currents becomes zero in the all-coil energized period during which driving currents are flowed to all the motor driving coils.

22. The motor driving method according to claim 10, wherein in the non-energized period during which only one motor driving coil is set to the non-energized state, waveforms of the coil currents of the respective phases are formed such that a total sum of products of multiplication of the coil currents of the respective phases and shaft direction force constant waveforms different by 90° in phase from torque constant waveforms of the coil currents becomes substantially zero.

23. The motor driving method according to claim 10, wherein in the non-energized period during which only one motor driving coil is set to the non-energized state, the coil currents of the respective phases are controlled to have waveforms such that each of products of multiplication of the coil currents of the respective phases and respective sine functions different by 90° in phase from current phases of the coil currents of the respective phases mutually form a shape substantially axially symmetric with respect to a symmetry axis of an intermediate time point of the non-energized period.

24. The motor driving method according to claim 10, which is a driving method for a sensorless three-phase motor, wherein waveforms of the coil currents of the respective phases are formed such that a function of a product of multiplication of a second-phase coil current delayed in phase by an electrical angle of 120° from a first phase and a sine wave delayed in phase by an electrical angle of 90° from a second-phase coil current has substantially a same magnitude and an opposite polarity with respect to a function of a product of multiplication of a third-phase coil current advanced in phase by an electrical angle of 120° from the first phase and a sine wave delayed in phase by an electrical angle of 90° from a third-phase coil current, in an non-energized period of the first phase coil current.

25. The motor driving method according to claim 10, which is a driving method for a sensorless three-phase motor, wherein waveforms of the coil currents of the respective phases are formed such that, a function of a product of multipiication of a second-phase coil current delayed in phase by an electrical angle of 120° from a first phase and a sine wave delayed in phase by an electrical angle of 90° from a second-phase coil current and a function of a product of multiplication of a third-phase coil current advanced in phase by an electrical angle of 120° from the first phase and a sine wave delayed in phase by an electrical angle of 90° from a third-phase coil current, form substantially a symmetric shape with respect to an intermediate time point of the non-energized period of the first phase coil current set as a symmetry axis thereof.

26. The motor driving method to claim 10, which a driving method for a multiphase motor having the number of phases being N, wherein, assuming that k represents an integer from 1 to N, a function of the coil current of the respective phases is represented by $f(\theta-(k-1)\cdot 360/N)$, and a fundamental wave related to an overall cycle of $f(\theta)$ is represented by $\sin(\theta)$, $f(\theta)$ is a function satisfying an equation all the time as following:

$$\Sigma f(\theta-(k-1)\cdot 360/N)\cdot \cos(\theta-(k-1)\cdot 360/N)=0$$

wherein $\Sigma$ represents a sum of the products of the coil currents of the respective phases and a sine wave advanced by an electrical angle of 90° from the fundamental wave thereof with respect to all the phases in the range from k=1 to k=N.

27. The motor driving method according to claim 14, wherein, in a period during which a motor coil of one phase is in an non-energized state, coil current waveforms of the other phases that are not in the non-energized state are formed such that, when a fundamental wave component of the corresponding current waveforms is represented by $\sin(\theta)$, the current waveform of one phase, the fundamental wave component of which is represented by $\sin(\theta)$, is proportional to $\sin(\theta-30)$ in a period during which the other one phase is in the non-energized state during a transition from a zero current level to a peak of the sine wave and in a period during which the other one phase is in the non-energized state during a transition from a zero current level to a bottom of the sine wave, and the current waveform of the one phase, the fundamental wave component of which is represented by $\sin(\theta)$, is proportional to $\sin(\theta+30)$ in a period during which the other one phase is in the non-energized state during a transition from the peak of the sine wave to the zero current level and in a period during which the other one phase is in the non-energized during a transition from the bottom of the sine wave to the zero current level.

28. The motor driving method according to claim 10, wherein a coil current waveform in an energized period of a coil of a certain one phase interposed between a non-energized period of the coil of the certain one phase and a non-energized period of a coil of the other phases adjacent thereto is formed to be substantially a triangular shape wherein the current value becomes zero on the non-energized period side of the coil, whereby the coil currents of the respective phases are made to be continuous over all cycles.

29. The motor driving method according to claim 10, wherein motor driving is performed in a manner that a phase difference between the coil current waveform of the respective phases and the torque constant waveform of the respective phases is maintained to be substantially a constant angle.

30. The motor driving method according to claim 10, wherein one cycle of the continuous current waveforms of the respective phases having the non-energized periods includes an non-energized period, a subsequent slow-sloped current increase period, a subsequent sharp-sloped current increase period, a subsequent maximum current period, a subsequent sharp-sloped current decrease period, a subsequent slow-sloped current decrease period, a subsequent non-energized period, a subsequent slow-sloped current decrease period, a subsequent sharp-sloped current decrease period, a subsequent minimum current period, a subsequent sharp-sloped current increase period, a subsequent slow-sloped current increase period, and a subsequent non-energized period.

* * * * *

UNITED STATES PATENT AND TRADEMARK OFFICE
CERTIFICATE OF CORRECTION

PATENT NO. : 7,088,067 B2
APPLICATION NO. : 11/191853
DATED : July 27, 2005
INVENTOR(S) : Yasunori Yamamoto et al.

It is certified that error appears in the above-identified patent and that said Letters Patent is hereby corrected as shown below:

Column 35
Line 13, change "multipiication" to -- multiplication --

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,088,067 B2
APPLICATION NO. : 11/191853
DATED : August 8, 2006
INVENTOR(S) : Yasunori Yamamoto et al.

It is certified that error appears in the above-identified patent and that said Letters Patent is hereby corrected as shown below:

Column 35
Line 13, change "multipiication" to -- multiplication --

This certificate supersedes Certificate of Correction issued January 2, 2007.

Signed and Sealed this

Sixth Day of February, 2007

JON W. DUDAS
*Director of the United States Patent and Trademark Office*